United States Patent [19]

Harrison et al.

[11] Patent Number: 4,701,866
[45] Date of Patent: Oct. 20, 1987

[54] WHEEL LOAD MEASUREMENT

[75] Inventors: Harold D. Harrison, Powell; James M. Tuten, Columbus, both of Ohio

[73] Assignee: Battelle Memorial Institute, Columbus, Ohio

[21] Appl. No.: 679,165

[22] Filed: Dec. 7, 1984

[51] Int. Cl.$^4$ .......................... G01L 1/00; B61L 3/00; B61L 11/08
[52] U.S. Cl. .................................. 364/550; 246/249; 246/247; 246/169 R; 177/163
[58] Field of Search .................. 364/550; 246/169 R, 246/247, 1 R, 1 C, 3, 246, 249; 177/163

[56] References Cited

U.S. PATENT DOCUMENTS

| | | | |
|---|---|---|---|
| 2,442,491 | 6/1948 | Gieskieng et al. | 246/169 R |
| 3,164,341 | 1/1965 | Phillips | 246/169 R |
| 3,188,464 | 6/1965 | Gieskieng | 246/169 R |
| 3,558,876 | 1/1971 | Douglaston | 246/246 X |
| 3,844,513 | 10/1974 | Bernhardson | 246/169 R |
| 4,058,279 | 11/1977 | Frielinghaus | 246/169 R |
| 4,283,031 | 8/1981 | Finch | 246/247 X |
| 4,491,841 | 1/1985 | Clark | 246/249 X |

FOREIGN PATENT DOCUMENTS 7804452 10/1979 Netherlands ....................... 246/169

OTHER PUBLICATIONS

"Bad Wheels Spotted in Motion", Railway Age, Dec. 16, 1963, pp. 23 and 30.

Primary Examiner—Errol A. Krass
Assistant Examiner—Joseph L. Dixon
Attorney, Agent, or Firm—Philip M. Dunson

[57] ABSTRACT

Apparatus for measuring loads transmitted via wheels to a track from vehicles travelling thereon, comprises means responsive to load at a plurality of approximately equally spaced locations on a selected portion of the track at least about equal in length to the circumference of a typical wheel passing thereover, for providing a signal that is a function of the largest load on the track from each wheel, means responsive to the signal for comparing each largest load with at least one selected load level, and means responsive to the load comparing means for identifying each wheel from which any load greater than a selected level was transmitted.

19 Claims, 19 Drawing Figures

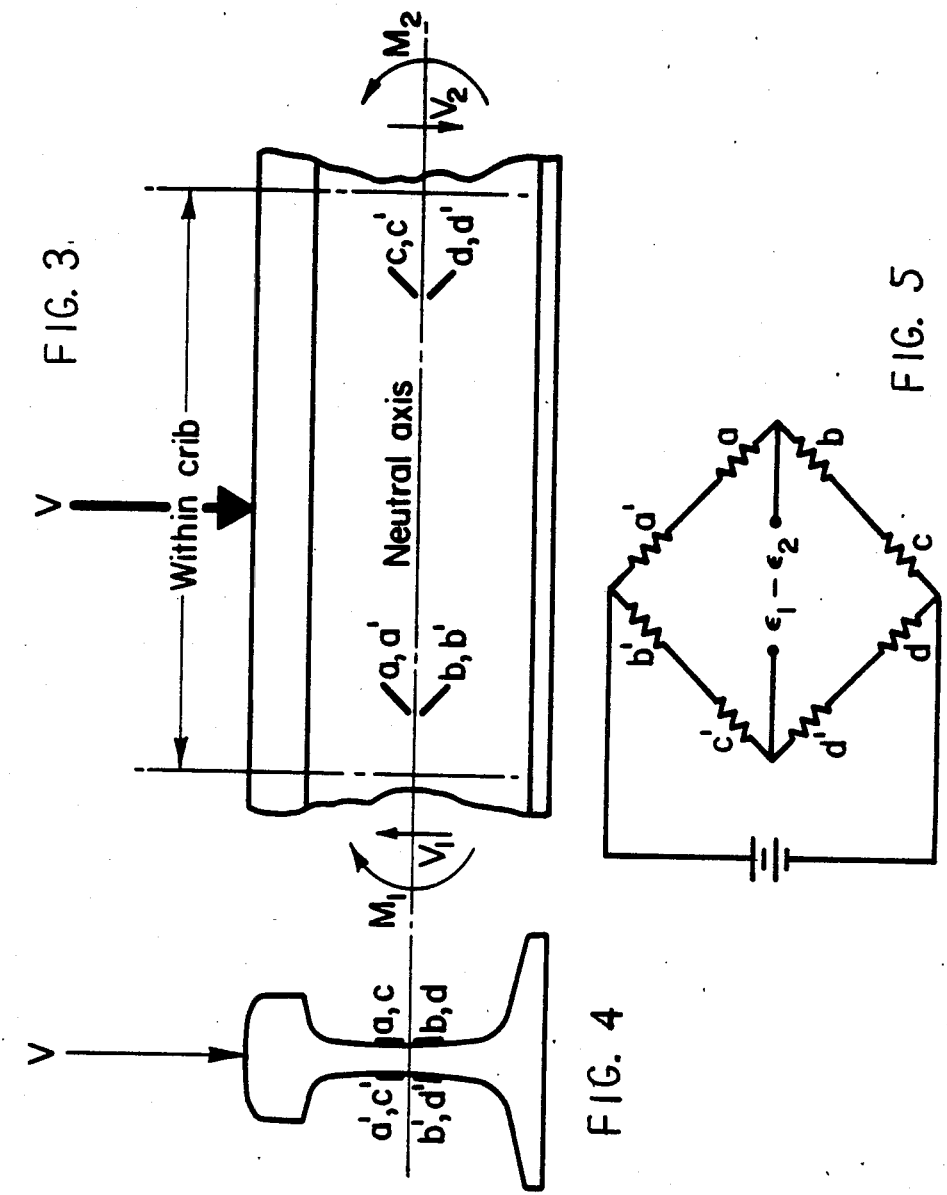

WHEEL LOAD MEASUREMENT

FIELD

This invention relates to methods and apparatus for measuring loads transmitted via wheels to a track from vehicles travelling thereon and for processing data related to such loads.

The invention is especially useful for measuring dynamic vertical wheel loads on railway track and for analyzing and recording the loads to provide information to facilitate effective and efficient preventive maintenance. Typical apparatus according to the present invention comprises means responsive to load at a plurality of approximately equally spaced locations on a selected portion of the track at least about equal in length to the circumference of a typical wheel passing thereover, for providing a signal that is a function of the largest load on the track from each wheel, means responsive to the signal for comparing each largest load with at least one selected load level, and means responsive to the load comparing means for identifying each wheel from which any load greater than a selected level was transmitted.

The following disclosure includes, with slight revision, the paper "Design, Validation and Application of a Monitoring Device for Measuring Dynamic Wheel/Rail Loads", by James M. Tuten and Harold D. Harrison; presented at the Winter Annual Meeting, New Orleans, La., Dec. 9-14, 1984, of The American Society of Mechanical Engineers; Paper No. 84-WA/RT-10.

Appended to this specification in the file of the application for this patent is a listing, in Pascal, for a typical program (FECPGM) that has been used in the data processing portion of typical apparatus according to the invention to provide a wide variety of information and operations that are advantageous in carrying out the invention.

BACKGROUND

A device for measuring dynamic vertical wheel loads was designed and implemented for the primary purpose of detecting abnormal vertical loads due to wheel irregularities. Using a special test train, loads generated by different types of irregularities were measured and documented. The device was installed on a revenue service rail line and is currently used to monitor traffic loads and detect wheel anomalies. A design overview and results of the field tests are presented and an analysis of revenue loads.

A device for automatically measuring, analyzing, and recording dynamic wheel/rail loads was designed and implemented as a result of an investigation of concrete tie track performance. The primary use of the device is the detection of the abnormal dynamic loads resulting from wheel tread irregularities, and the reporting of this information at a remote terminal. Using multiple microcomputers controlled by a 68000-based VME microcomputer system, the wheel impact load detector reads vertical wheel loads from strain gage patterns in the web of the rail in a series of successive tie cribs, sampling approximately seven to ten percent of each wheel circumference per crib. Different data options are available at a remote terminal, including all wheel loads (i.e., all axles, all measurement sites), loads exceeding either of two adjustable load thresholds, or cumulative load statistics (axle counts in speed and load bands).

The first wheel impact load detector was installed on a concrete tie section of Amtrak's high-speed Northeast Corridor rail line, and is currently being used both as a means for monitoring wheel conditions for wheel maintenance programs and as a tool for developing wheel load environment statistical descriptions. In this paper, a design overview and the results of experiments with a test train are presented. An analysis of revenue traffic dynamic wheel loads and their impact on track and equipment life is also discussed.

The authors have been involved with the measurement and characterization of wheel/rail loads through the use of wayside measurements over the last decade for the U.S. Department of Transportation (both the Federal Railroad Administration [FRA] and the Transportation Systems Center [TSC]), Amtrak, and the Association of American Railroads (AAR). The majority of these studies have included statistical characterizations of the loads generated by either revenue traffic [1] or special test consists [2]. In these and other test programs, the main area of interest focused on the loads generated by vehicle dynamics.

In June 1980, inspections of concrete crossties on the Northeast Corridor revealed numerous ties with transverse rail seat cracks. As part of a research program [3] being conducted at that time, it was determined that these cracks were being caused by high peak vertical loads generated by wheel tread irregularities on Amtrak passenger coaches. Investigations revealed that long wavelength, out-of-round conditions often existed on the worst wheels. These wheels were identified as causing the most severe vertical loads, sometimes exceeding 100 kips (445 kN). More significantly, these wheels were very difficult to detect through normal visual inspection, and in fact, often would pass existing geometry wheel condemning limits. As a result of these findings, Amtrak and DOT/FRA undertook a program to have Battelle's Columbus Laboratories develop, manufacture, install, and test a permanent monitoring device to detect wheels which produced excessive loads. The resulting wheel impact load detector was built and installed in mid-1983 on the Northeast Corridor near Edgewood, Md. Since that time, it has been used to accomplish various goals which are covered in this paper.

The initial problem which led to the development of the wheel impact load detector was early signs of tie rail seat cracking on portions of 400 track-miles (644 km) of concrete-tie track installed on Amtrak's Boston-to-Washington line. These "hairline" cracks were first detected during a program being conducted to correlate the performance of concrete tie track in revenue service with its performance at the Facility for Accelerated Service Testing [4]. Measurements in that program included vertical and lateral wheel/rail loads, tie center and rail seat bending moments, and rail and tie accelerations. The instrumentation methodology used to make these measurements and the data reductions performed are described in [5]. An example time history showing rail loads and tie strains is shown in FIG. 1. One of the field test measurement sites was located near Aberdeen, Md., where rail seat flexural cracks were discovered on this relatively new track as part of the site inspection and preparation for dynamic measurements. The first indication of impact loading occurred from examination of tie bending moment oscillographic traces, which showed that tie response under wheels with surface irregularities was highly oscillatory, typically in "tone bursts", which are evident in FIG. 1. However, rail seat bending mements up to only 220 kip-in (25 kN-m) and vertical wheel/rail loads up to 65 kips (290 kN) were observed, which is well below the 375 kip-in (42 kN-m) cracking thresholds identified in laboratory tests. These data, however, used a 300-Hz, low-pass filter for analysis. This bandwidth was determined from previous analysis to be more than adequate when measuring loads due to normal wheel passage. In a further review of the Aberdeen measurements, the data were processed with low-pass filters set at 2 kHz, and one peak rail seat bending moment of 370 kip-in (42 kN-m) was measured in the 8-day block of data [6]. This clearly showed that tie rail seat craking could be caused by these relatively frequent impact loads.

The full effects of dynamic loading are illustrated in FIG. 2, which compares the cumulative distribution of both the calculated static and the measured dynamic wheel loads. The static loads were determined by acquiring revenue consist lists throughout the period of dynamic data collection, and tabulating the gross loads of the cars listed to develop the cumulative curve. This allowed for direct statistical comparisons between static and dynamic loads without direct knowledge of the static weights of the individual axles.

The variation between the static and dynamic load curves at any one point can be caused by four factors: (1) Static weight distribution to each wheel on any car will rarely be exactly ⅛ of the gross load listed on the train consist sheet. Uneven car loading, as well as imperfect load distribution within a truck's suspension, will cause a variability in the loads seen at each wheel; (2) Dynamic wheel impacts caused by irregularities in either the wheels or the rail surfaces; (3) Variation of wheel force due to vehicle/track interaction, such as curving imbalance, car rocking, and pitch and bounce; (4) Differences in calibration between the scales used to measure the gross carloads and the circuits used to measure the dynamic wheel loads.

FIG. 2 shows a relatively close matching of the loads determined statically and dynamically over 90 to 95 percent of the axles. On the static curves, the near-vertical line segments represent subpopulations of vehicles which are listed in the consists as having identical gross loads. The corresponding segments of the dynamic curves typically have finite slopes which indicate the normal scatter in actual wheel loads about the average of these subpopulations. In the lower portion of the plot, static and dynamic loads begin to diverge significantly because of the superposition on the dynamic load curve of an additional subpopulation of loads from wheels having tread irregularities, including spalled and eccentric profiles and slid flats. Although a direct interpretation of the two curves in this low-probability, high-load region might imply that these higher loads caused by wheel irregularities are being superimposed only on the heaviest nominal wheels, a detailed examination of the wheel load data shows that nominally lighter wheels also contribute to these incremental dynamic loads. It has been shown [7] that the dynamic increment is governed almost entirely be unsprung mass such that car load is additive rather than multiplicative. It should also be emphasized that these data were collected on well-maintained track without rail surface irregularities or visible geometry errors, and that a more comprehensive indentification of impact loading and the wheels which cause it was needed.

The measurement of vertical wheel loads in the aforementioned programs was accomplished using a circuit adapted from strain gage patterns reported by the ORE [8, 9]. This pattern, shown in FIGS. 3 and 4, measures the net shear force differential between the two gaged regions, a–b and c–d as in the diagram. With the gage pattern placed within a free span of rail (the "crib" space between crossties), the circuit output is directly proportional to the vertical load, V, as it passes between the gages. The influence zone of the pattern is short for a normal crib width, typically 4 to 6 inches (10 to 15 cm) less than the distance between a–b and C–d, so that only a sample of short time duration is provided from each passing wheel. From laboratory and field tests, this pattern has shown excellent linearity and minimal sensitivity to lateral load (cross talk) or to the lateral position of the vertical load.

The output signal for a single wheel passing three typical gage circuit installations is shown in FIG. 1. A smooth wheel rolling over a circuit installed in a wide crib will produce a trapezoidal-shaped signal with uniform sensitivity over the center portion of the signal. As the speed of the passing wheel increases, two effects have influence on the output signal. The first is the frequency response of the measurement, including effective rail mass and dynamic stiffness effects, and signal conditioning. The second effect is the load variation introduced by wheel or rail irregularitites and vehicle dynamics. Rail mass effects are negligibly small compared to the wheelset mass which induces the dynamic load. The rail mass is roughly that associated with the span between the gages. Some rounding of the waveshape into a smoothed trapezoidal pulse is noticeable at speed, and is due to the combined dynamic effect. Although this effect does not change the peak value obtained from the center of the circuit, it does tend to attenuate the "shoulders" of the circuit's response slightly. A similar effect can be caused by using signal conditioning with too low a frequency cut-off. As discussed earlier, this will significantly reduce the peak response of the circuit, causing underestimation of impact load whenever signal bandwidth is below about 2 kHz [6].

FIG. 1 illustrates load time histories over several circuits. These signals are similar to those obtained from the circuit installations which are part of the Amtrak wheel impact load detector installation. The peak signal shown for site 1 is due to a wheel flat, and will be discussed in a later section. The load variations shown for sites 2 and 4 are due to minor wheel dynamics and/or imperfections.

The gage circuits which were installed on the first Northeast Corridor system are arranged so that the trapezoidal "influence zone" has a full amplitude portion of roughly 8 inches (20 cm) in length.

In FIG. 1, the circuit output from site 1 showed a wheel impact superimposed on the nominal wheel load. This pulse was approximately a half-sine wave of 3 milliseconds duration, representing an impact load of 55 kips (250 kN). Field experience has shown that an impact pulse varies in both duration and magnitude with train speed and defect type. An impact pulse is typically one to three milliseconds in duration, but may be as short as one-half millisecond when caused by a small defect traveling at high speed. It is possible to obtain multiple impacts and zero values from a severe defect within the measurement "influence zone." It is also possible for wheels to "leap over" a measurement site if a severe defect is encountered just before the measurement site, causing the wheel to "lift off" and impact the rail beyond the actual measurement zone. Another phenomenon associated with severe impacts is rail ringing, which occurs when a severe rail impacts sets up shear and bending waves in the rail. These are usually exhibited as a resonant stress wave well within the necessary 2 kHz bandwidth which travels down the rail and produces signals simultaneously, within the time frame of interest, at adjacent instrumented locations. This traveling wave can produce rail circuit outputs which are greater than those induced by empty freight cars.

After the signal produced by the load measuring circuit was properly characterized using field instrumentation, it became possible to define the requirements for a system to detect wheel impacts in an automated, single purpose device. The major design requirements for data acquistion will be discussed first, followed by data reduction requirements. Finally, system integration contraints will be addressed.

The major goal of the original wheel impact load detector system was to detect and identify wheel tread imperfections which cause damage to concrete tie track. These imperfections may occur anywhere along the circumference of a wheel, which for a standard 36 inch (91 cm) wheel, translates into approximately 110 inches (2.8 m) of tread to be inspected. Since the current measurement circuit used has discrete "influence zones" of about 8 inches (20 cm) in length, a number of circuits must be used to inspect a wheel on a single roll-by. For the wheel impact load detector constructed for Amtrak, four measurement circuits were used, giving about 30 percent inspection of each wheel as it passed the measurement array. Since Amtrak has a captive fleet, each wheel may pass the measurement array several times a week, and should therefore be subject to an inspection of the full wheel tread on no more than a semi-weekly basis. For other applications such as the inspection of interchange freight traffic, a larger measurement array would be desirable. By doubling the number of measurement circuits to eight and adjusting the circuit spacing, about 70 percent inspection of a 36 inch (91 cm) wheel is achieved.

It was decided to instrument a single rail for the measurement array since it was hypothesized that most wheel anomalies occur in pairs on an axle. Because this hypothesis has not been proven, it will be the subject of future research. For the initial system installations, any channel expansion which occured was along a single rail to accomplish a more complete inspection of a single wheel on an axle rather than partial inspection of both wheels.

Given the nature of the dynamic load signals, it was determined that for the true impact peak to be detected within 5 percent, the digital sample rate must be nearly 30 kHz for each rail circuit. At the other extreme, the system must be able to inspect a 600-axle freight moving at 25 mph (40 km/h), thus requiring continuous sampling for 6 to 8 minutes, which represents about 100 million data samples for an eight circuit system.

DISCLOSURE

In order to accommodate these high sample speed and storage requirements, a multiple microcomputer configuration proved to be the most cost effective approach. Each measurement circuit would require a dedicated "front end" microcomputer to sample the analog strain gage amplifier signal output and determine the peak wheel load from each passing wheel. This value would then be transmitted to the "master" computer for post train passage analysis. A block diagram of the system is presented in FIG. 6. Other features required to make the data acquisition portion of the system functional include:

Automatic zero drift compensation of the strain gage circuits;
Automatic shunt calibraiton of the strain gage circuits to verify proper operation;
Electrical isolation from power sources and rail potentials, particularly on electrified track such as Amtrak's;
Self-checking capability;
Inherent protection from electrical noise and lightning strikes to the rail; and,
Immunity to false noise glitches and impacts outside of the measurement zone.

Custom microcomputers, designed to meet the above criteria, were then implemented in the Amtrak system.

The master computer, a 68000-based VME microcomputer system, maintains control of the front-end microcomputers and all auxiliaries, and performs all data processing tasks, including the following:

Collection of peak load values from the data acquisition microcomputers;
Selection of peak loads above a pair of adjustable thresholds, and preparation of an exception report which includes car number (i.e., position in consist), and load value for each exception;
Automatic dialing over commercial telephone lines to multiple remote printer terminals for output of multiple specified reports; Generation of cumulative statistics on load values, exceptions, and axle counts (statistics are currently maintained based on load, speed, and temperature); and,
Time of day and date annotation on all transmitted reports.

Other system features include:

Automatic answer of incoming modem communications for manual data requests and remote configuration changes;
Railroad signal sensing for self-initialization;
Automatic error recovery and correction;
Continued operation while compensating for partial system failure, particularly analog system or data acquisition microprocessor failure;
Non-volatile data, program, and configuration storage; and,
Mechanical and electrical design for unattended, adverse environment operation.

The first system to meet all design criteria was developed and fully implemented on the Northeast Corridor late in the fall of 1983.

The Amtrak system as currently implemented is housed in a sealed, stainless steel enclosure 2 ft×2 ft×1 ft (60 cm×60 cm×30 cm) located approximately 15 ft (4.7 m) from the instrumented track. Power is provided by 100 Hz, 110 volt wayside power. A standard two-wire communications line is connected from the impact detector's integral modem to a commercial telephone junction box located in the Edgewood tower approximately one mile away. Connections into Amtrak's signal system is accomplished in a nearby signal cabinet.

After installation of the preliminary version of the system in late spring 1983, checkout and calibration began. Initial verification of the strain gage circuits was performed using static loading fixtures used in [4]. During the initial operation phase, analog signals from the strain gage circuits were processed both by the wheel impact load detector and by the manual processing of oscillographic recordings. After the correction of several minor problems in late 1983, the system began functioning as a production maintenance device in January 1984. A sample of a typical exception report as produced by the system is shown below.

The main impetus for developing the wheel impact load detector was to detect, track, and thereby facilitate removal of damage causing wheels from the Amtrak operational fleet. Beginning in January 1984, wheels causing loads above 60 kips (267 kN) were tracked and identified. Shortly thereafter, a program to turn tagged wheels was initiated, which resulted in an immediate drop in the probability of occurrence and worst case magnitude of impact loads above the 60 kips (267 kN) maintance threshold, as illustrated in FIG. 7. The average percentage of measured high speed passenger wheel loads exceeding 60 kips (267 kN), is currently below the 0.05 percent exceedance level as compared with the 1.0 percent exceedance level measured during the initial tests of June 1980 [6]. This may be compared with the freight traffic statistics which have remained constant with about 0.14 percent of the measured loads exceeding 60 kips (267 kN), a value which has remained constant since the June 1980 tests.

Unfortunately, the relative importance of damage caused by freight traffic is now greater than before. It is estimated that about 2 percent of all freight wheeelsets cause impacts greater than 60 kips (267 kN), and 0.5 percent cause impacts greater than 75 kips (334 kN), the approximate tie cracking threshold. This is equivalent to 100 wheelsets per week being capable of cracking ties. Each week, several freight loads are measured which exceed the 102 kip (454 kN) digital saturation limit of the wheel impact load detector.

The program for reduction of passenger-traffic-induced cracking loads has been an extraordinary success because of the accurate identification of these loads by the detector, and the diligence of the Amtrak personnel involved in the maintenance program. The occurrence of passenger traffic causing a tie cracking load was virtually eliminated in about two months, and in the short time this program has been in effect, the exception threshold was lowered from 60 to 55 kips (267 to 245 kN), thus progressively improving the fleet wheel condition. In addition, loads at the extreme load limits have been completely eliminated from the fleet.

| WHEEL EXCEPTION REPORT | | | |
|---|---|---|---|
| Train Passed at 14:42:16 | | 84/06/02 | |
| Speed = 121. Axle Count = 28 | | Box Temperature = 122. | |
| Ground Temperature = 83. | | | |
| Levels = 40. 55. kips | | | |
| Axle Number | Car Number | Level 1 Exceeded | Level 2 Exceeded |
| 9 | 3 | | Yes 62. |
| Train Passed at 14:47:09 | | 84/06/02 | |
| Speed = 61. Axle Count = 12 | | Box temperature = 126. | |
| Ground Temperature = 83. | | | |
| Levels = 40. 55. kips | | | |
| Axle Number | Car Number | Level 1 Exceeded | Level 2 Exceeded |
| No Loads Above Limits | | | |

| WHEEL EXCEPTION REPORT -continued | | | |
|---|---|---|---|
| Train Passed at 15:01:27 | | 84/06/02 | |
| Speed = 48. Axle Count = 272 | | Box temperature = 126. | |
| Ground Temperature = 87. | | | |
| Levels = 40. 55. kips | | | |
| Axle Number | Car Number | Level 1 Exceeded | Level 2 Exceeded |
| 4 | 1 | Yes 43. | |
| 10 | 3 | Yes 40. | |
| 90 | 23 | Yes 41. | |
| 96 | 24 | Yes 42. | |
| 167 | 42 | | Yes 58. |
| 168 | 42 | Yes 52. | |
| 190 | 48 | Yes 47. | |
| 193 | 49 | Yes 40. | |
| 194 | 49 | Yes 43. | |

A series of controlled tests were performed in late November 1983 at the Northeast Corridor wheel impact detector site using a special Amtrak test train. The objectives of the tests were (1) to determine the influence of train speed on wheel/rail vertical loads for Amtrak passenger equipment with wheels in several worn conditions, and (2) to correlate wheel tread condition with the resulting impact load. The tests were performed with a test train comprising cars initially identified by the impact detector (during normal revenue operation) as having bad wheels. This train was run through the detector site over a speed range of 20 to 120 mph (32 to 193 km/h) during two nights of testing. Immediately following the tests, some of the wheelsets were removed from the equipment for measurement of profiles at the Ivy City (Washington, DC) wheel shop. A fixture was fabricated at Battelle using a spring loaded piece of rail head that provided a measurement of changes in the effective rolling radius of the wheel as the wheel was turned on its bearings. These values were measured with a dial indicator on one-inch imcrements around the circumference of a wheel, and provided a direct measurement of the profile error.

Test Train Load Statistics: Level exceedance curves plotted in FIG. 8 compare the load statistics for the test train to those for one week of revenue traffic. The higher concentration of wheel impact loads from the test train is evident in the resulting curves. For example, slightly greater than 2 percent of the measured wheel/rail vertical loads exceeded 50 kips (222 kN) for the test train, while only 0.4 and 0.6 percent exceeded 50 kips (220 kN) for freight and passenger traffic, respectively. Although the test train had a higher than normal population of worn wheels, the impact detector measurement site was capable of detecting about 25 to 30 percent of a wheel's circumference as it passed by. Thus, the probability of measuring the impact load from each wheel tread defect for a single train pass was also roughly 25 to 30 percent. Consequently, repeat runs were made at various speeds to increase the probability of capturing the worst-case impact at least once. The random nature of the measured wheel/rail loads is reflected in the loads versus speed plots presented below.

Load-versus-speed plots for the most severely worn wheels on the test train's Amfleet and Heritage equipment are presented in FIGS. 9 and 10 respectively. As previously discussed, there is a large variance in the load values at a single speed since the probability of capturing peak impact loads on a single train pass is about 25 to 30 percent. However, a sufficient number of repeat train passes was made so that typical peak impact loads were measured at several speeds. In each figure, two curves have been drawn, one representing the linear envelope of the largest measured loads, and the other a least-squares curve fit through the largest loads measured at each speed. The curves indicate that there is a measurable increase in load with increasing speed. For example, based on the mean curves of largest loads, the increase in load for a factor of four speed increase (25 to 100 mph, 40 to 160 km/h) is about 35 percent for Heritage wheelsets and about 70 percent for Amfleet wheelsets. These relatively modest increases in load suggest that it would probably be neither effective nor economical to place slow orders on trains with "bad" wheelsets as an alternative to removing the wheelsets from service, since those wheelsets may cause damaging loads even at lower speeds, as shown in the load-versus-speed plots.

The differences between loads measured from the Heritage and Amfleet equipment are attributable mainly to the larger population of out-of-round wheels and long wavelength profile errors on the Heritage equipment. These differences in wheel profile characteristics in turn may be caused by different mileages accumulated by the equipment, and possibly by differences in truck suspension characteristics.

Plots of wheel "run-out" (i.e., the change in radius from the axle centerline to the running surface) for several wheels from the test train are presented in FIG. 11. As shown, the test train comprised wheels with a wide range of profile conditions. Loads from several of these wheels were evaluated to correlate wheel condition with impact loads. Example cases are discussed below:

Case (1): Axle 9. The major anomaly on this Amfleet wheelset was a 1 by 1 in. (25 mm×25 mm) spall, as indicated in FIG. 11 by the 0.050 in (1.27 mm) run-out near the 45 in. (114 cm) circumference location. The measured loads from this wheel indicate peak impact loads in the range of about 65 to 75 kips (289 to 334 kN) at speeds above 70 mph (113 km/h).

Case (2): Axle 10. A significant characteristic of this Amfleet wheelset is that it was not condemnable by AAR standards. (A.A.R. Interchange Rule 41A1m which states that a wheel is "Condemnable at any time" if the following conditions exist "Out of round: in excess of 1/32 inch within an arc of 12 inches or less with use of gage as shown" or Rule 41A1 on Slid Flats which cites that a wheel is "condemnable at any time" if a slid flat is "a. Two inches or over in length b. Two or more adjoining spots each 1½ inch or over in length.")

The principle anomaly on the wheelset was a long, narrow chain of spalls which is indicated in FIG. 11 by the 0.020 in. (0.50 mm) run-out near the 35 in. (89 cm) circumference location. The highest impact loads were measured from this wheelset at a low speed value of 30 mph (48 km/h) (about 45 kip or 200 kN) and at a high speed value of about 108 mph (174 km/h) (about 61 kip, 271 kN).

Case (3): Axle 19. This wheelset, from Hertiage equipment, is characterized in FIG. 11 by two irregularities which caused run-outs of about 0.038 in. (0.97 mm) and 0.027 in. (0.69 mm). (Profile errors were not collected outside these two areas.) The load data for this wheelset indicate a small speed effect; peak impact loads were measured between 60 and 75 kips (267 and 334 kN) over a wide speed range.

Case (4): Axle 21. This Heritage wheelset is another example of a non-condemnable profile which would pass AAR criteria. As shown in FIG. 11, small spalls (less than 0.030 in. (0.76 mm run-out) were present around the circumference. These irregularities were sufficient to cause peak impact loads of up to about 70 kips (311 kN).

Case (5): Axle 22. This Hertigage wheelset was the most severly worn on the test train. As indicated in FIG. 11, the wheelset was visibly out-of-round, with a spread rim and spalls everywhere on the tread except at locations of maximum run-out, where the spalls apparently were cold-rolled out. The loads data plotted in FIG. 12 for this wheelset indicate a possibly strong speed effect. Peak measured loads ranged from less than 40 kips (178 kN) at 30 mph (48 km/h) to nearly 90 kips (400 kN) at over 100 mph (161 km/h). This might be expected for such a severely worn profile. This case might be considered academic since the wheelset is condemnable, even though not necessarily for the right reasons. Greg Gagarin of Amtrak indicated that this wheel was condemnable for the spalls on the "tops" of the lobes where they had not been hammered out, but was not condemnable for the severely out-of-round condition. This case emphasizes the need for detecting and removing such a wheelset quickly to avoid potential severe track and equipment damage.

Case (6): Axles 17 and 18. These axles, from Heritage equipment, were freshly turned axles with no defects. As expected, the loads from these axles were extremely consistant. A peak load versus speed plot for these wheels is shown in FIG. 13. The loads produced by these wheels are constant with speed. Also shown in FIG. 13 is a histogram of the loads from the test. The mean axle load for these axles was 16.49 kips (73.3 kN) with a standard deviation of 0.87 kip (3.87 kN), or 5 percent. When compared with the wheels with irregularities, the 5 percent load variation is quite small.

These data imply that some worn wheels which pass AAR inspection criteria may cause large impact loads, which may in turn contribute to track deterioration and equipment damage.

Using the model presented in reference 10, calculations were performed which indicate that a typical wheel tread irregularity dissipates about 20 hp (15 kw) per wheel. The majority of this energy is dissipated into the track structure causing track degradation, while that energy reflected up into the vehicle reduces bearing and structural component life.

Using the wheel impact load detector, it is possible to quantify wheel surface imperfections in terms of the loads they produce. The inspection of wheels can be performed without having to manually check the running surface of every wheel. Therefore, it is possible to effectively and economically locate and maintain wheelsets as they deteriorate without over-maintaining or allowing damage producing equipment to remain in service.

REFERENCES

1. Ahlbeck, D. R., Johnson, M. L., Harrison, H. D., and Tuten, J. M., *Measurements of Wheel/Rail Loads on Class 5 Track*, Final Report, Report No. FRA/ORD-80/19, February 1980.

2. Harrison, H. D., and Tuten, J. M., *Perturbed Track Test Wayside Measurements*, Interim Report to Department of Transportation, Transportation Systems Center under Contract DOT-TSC-1595, July 1979.

3. Harrison, H. D., and Moody, H., "Correlation Analysis of Concrete Cross Tie Track Performance," *Proceedings, Second International Heavy Haul Railway Conference*, September 1982, Paper 82-HH-39, pp. 425–431.
4. Harrison H. D., et. al., *Correlation of Concrete Tie Track Performance in Revenue Service and at the Facility for Accelerated Service Testing*, Final Report, DOT/FRA/ORD-84/02.1, August 1984.
5. Dean, F. E., and Harrison H. D., et. al., *Investigation of the Effects of Tie Pad Stiffness on the Impact Loading of Concrete Ties in the Northeast Corridor*, Report by Battele's Columbus Laboratories to the Federal Railroad Administration, Improved Track Structures Research Division, Contract DOT-FR-9162, January 1982.
6. Tuten, J. M., "Analysis of Dynamic Loads and Concrete Tie Strain from the Northeast Corridor Track," Technical memo by Battelle's Columbus Laboratories to the Federal Railroad Administration, Improved Track Structures Research Division, Contract DOT-FR-9162, May 1981.
7. Harrison, H. D., Hadden, J. A., Ahlbeck, D. R., "Development of Safety Criteria for Evaluating Concrete Tie Track in the Northeast Corridor", Fourth Quarterly Progress Report to U.S. Department of Transportation, Federal Railroad Administration, May 16, 1984.
8. Anon., Question D71, "Stresses in the Rails, the Ballast, and the Formation Resulting From Traffic Loads," Interim Report No. 1, Stresses in Rails, ORE, UIC, Utrecht, Netherlands, April, 1096 (D71/PPI/E(44400)).
9. Anon., *ORE Colloquia*, "Measurements and Their Analysis in Railway Technology," Report No. 1, 5th International Colloquim of ORE/BVFA on Railway Vehicle Technology, Vienna, Austria, May 6–8, 1969 (Utrecht, October, 1060, AZ 40/RPI/E).
10. Ahlbeck, D. R., and Hadden, J. A., "Measurement and Prediction of Impact Loads for Worn Railroad Wheel and Rail Surface Profiles, ASME Technical Paper, 1984 Winter Annual Meeting.

DRAWINGS

FIG. 3 is side view of a portion of railway track showing a typical arrangement of strain gauges thereon in apparatus according to the present invention.

FIG. 4 is an end view of the track and strain gauges in FIG. 3.

FIG. 5 is a schematic diagram of a typical bridge circuit including strain gauges as in FIGS. 3 and 4 for measuring vertical wheel-rail loads in accordance with the present invention.

FIG. 8 illustrates test train load statistics compared with nominal freight and passenger traffic (before the wheel truing program).

FIG. 9 shows peak loads for the three worst wheelsets from an Amfleet car.

FIG. 10 shows peak loads for the four worst wheelsets from a Heritage car.

FIG. 11 shows wheel profiles from a consist used for field tests.

FIG. 12 shows peak loads for the worst wheel in the test consist.

FIG. 13 shows peak loads for freshly turned wheels.

Figure 15:
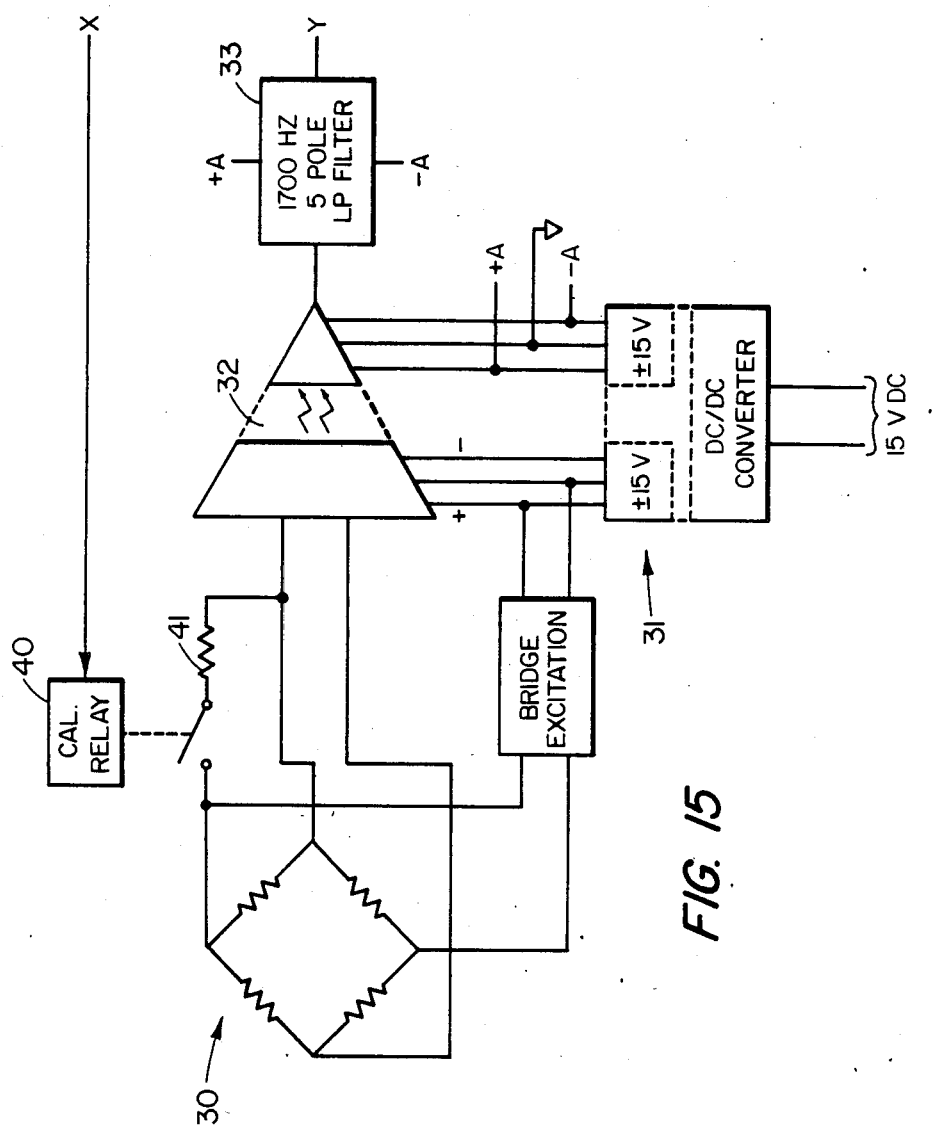
Figure 16:
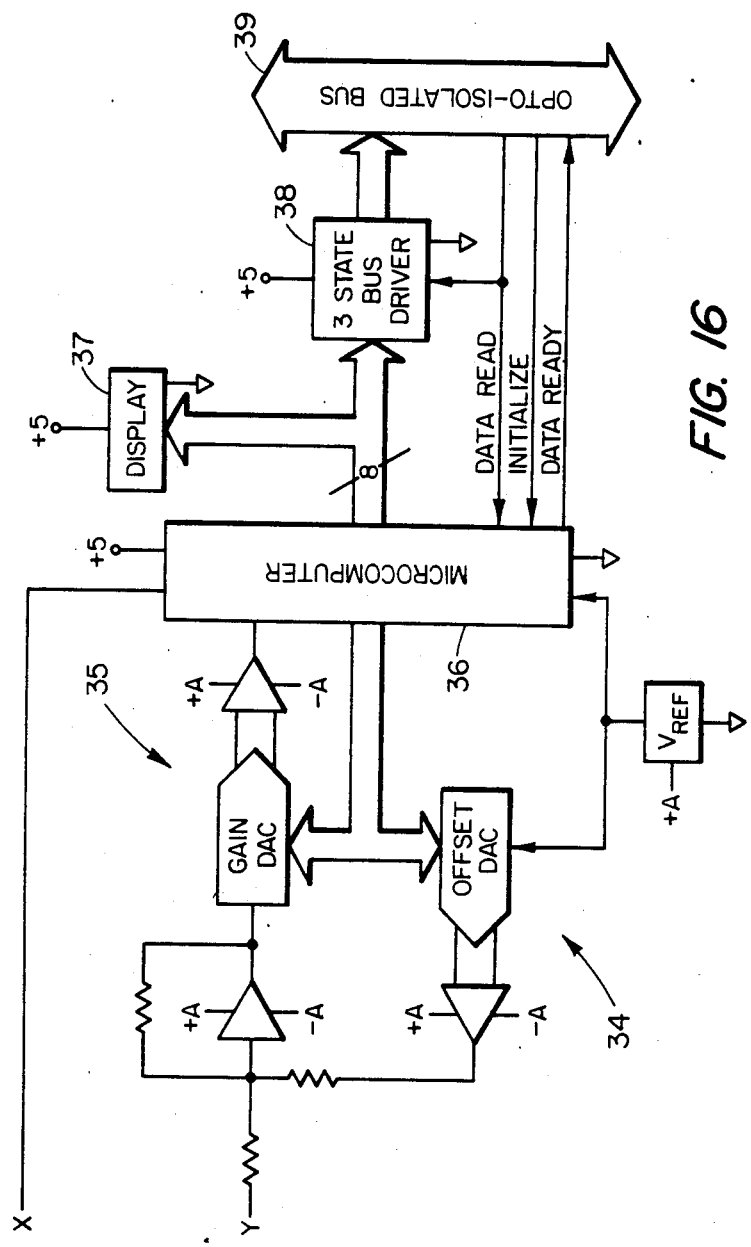

FIGS. 15 and 16 together form a schematic diagram of one channel of the "front end" of typical apparatus according to the invention.

Figure 1:
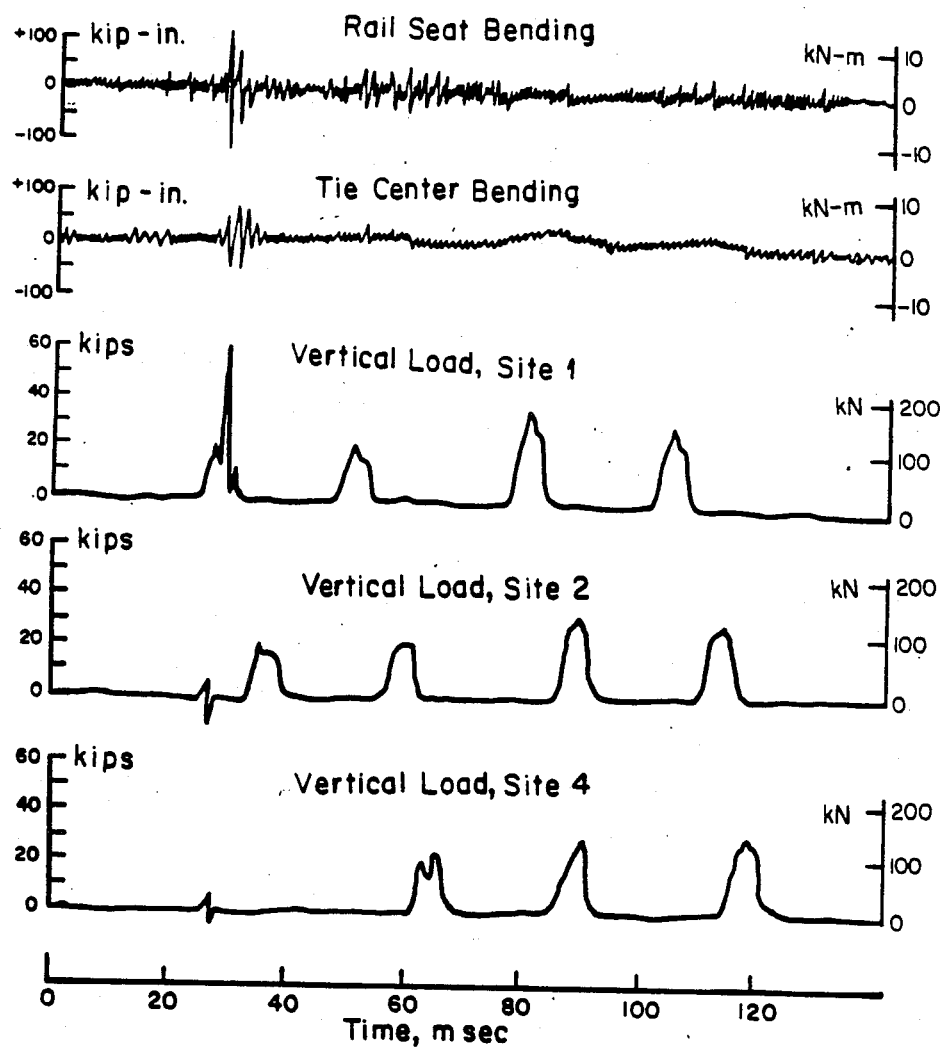
FIG. 1 is a graph showing time histories of wheel loads and tie strains recorded for a typical railway train and track.
Figure 2:
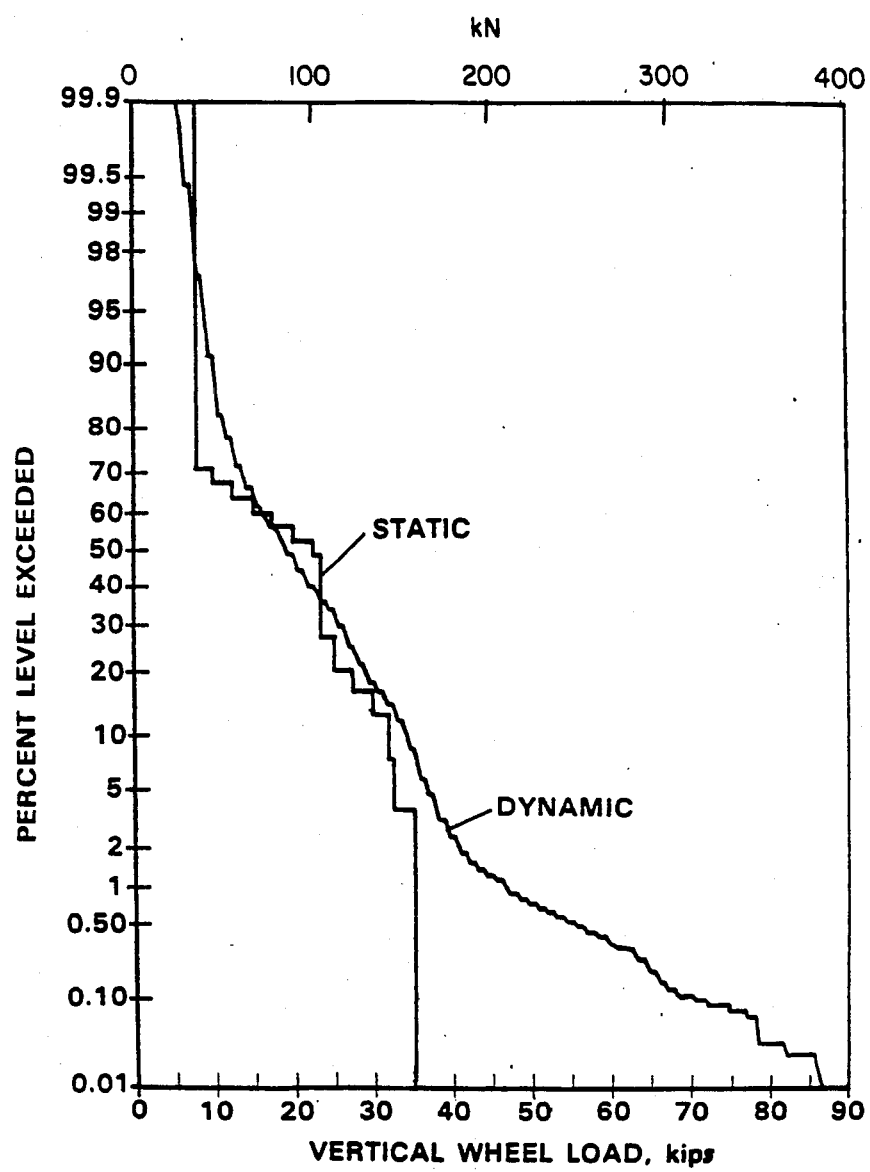
FIG. 2 is a graph comparing static and dynamic exceedance curves of vertical wheel load for a typical railway train and track.
Figure 6:
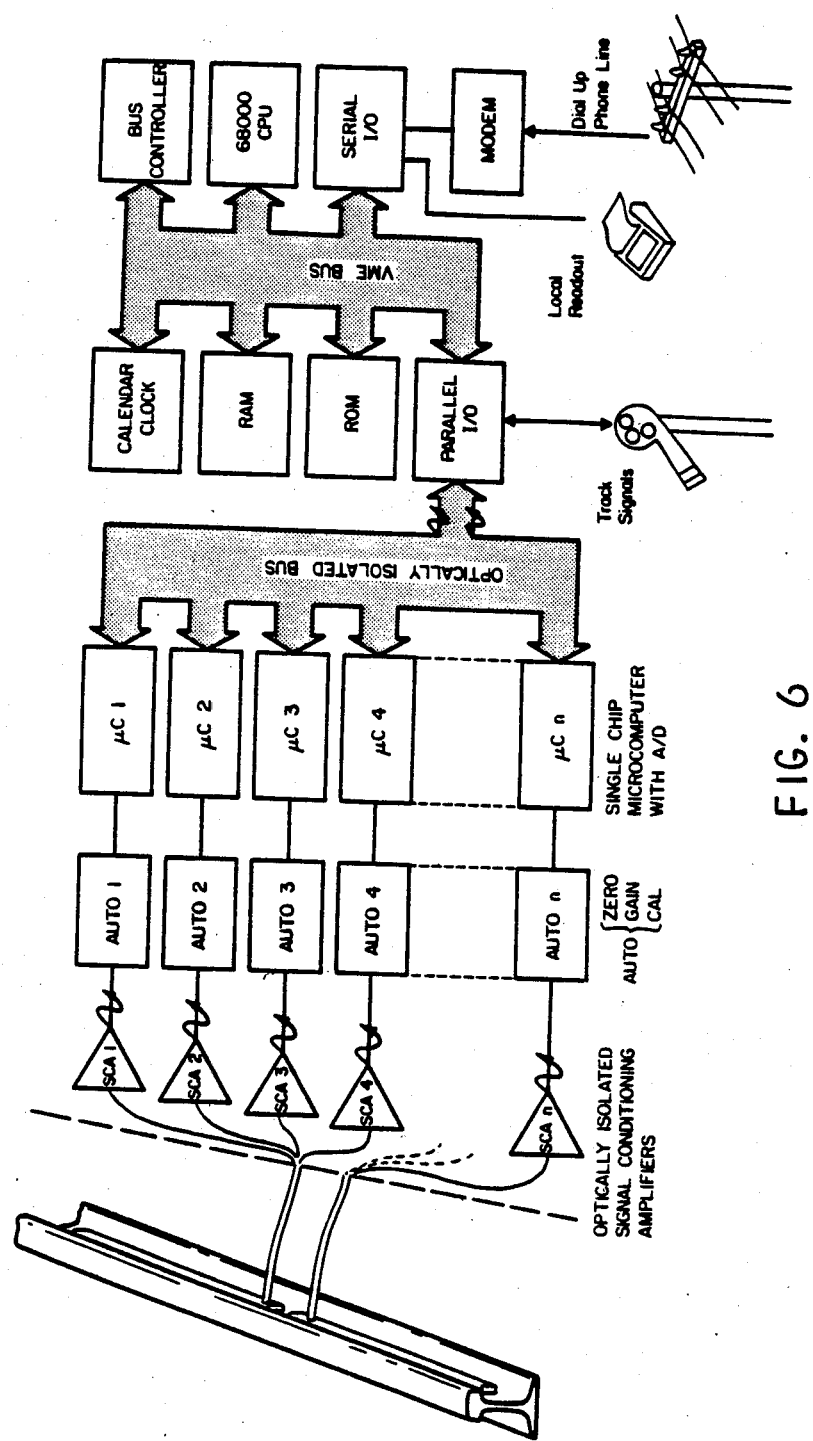
FIG. 6 is a block diagram of a typical wheel impact load detector system according to the invention.
Figure 7:
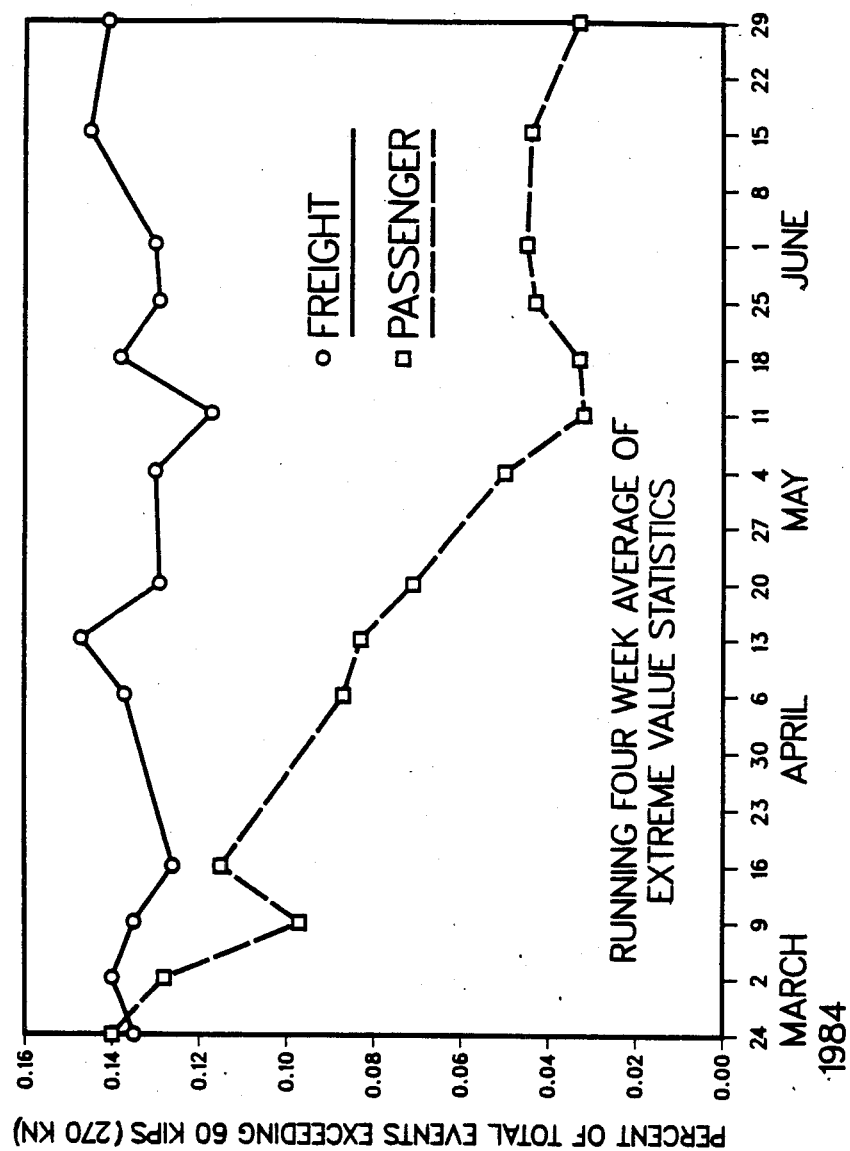
FIG. 7 is a graph showing results of an Amtrak wheel improvement program making use of data on wheel condition as obtainable with the present invention.
Figure 8:
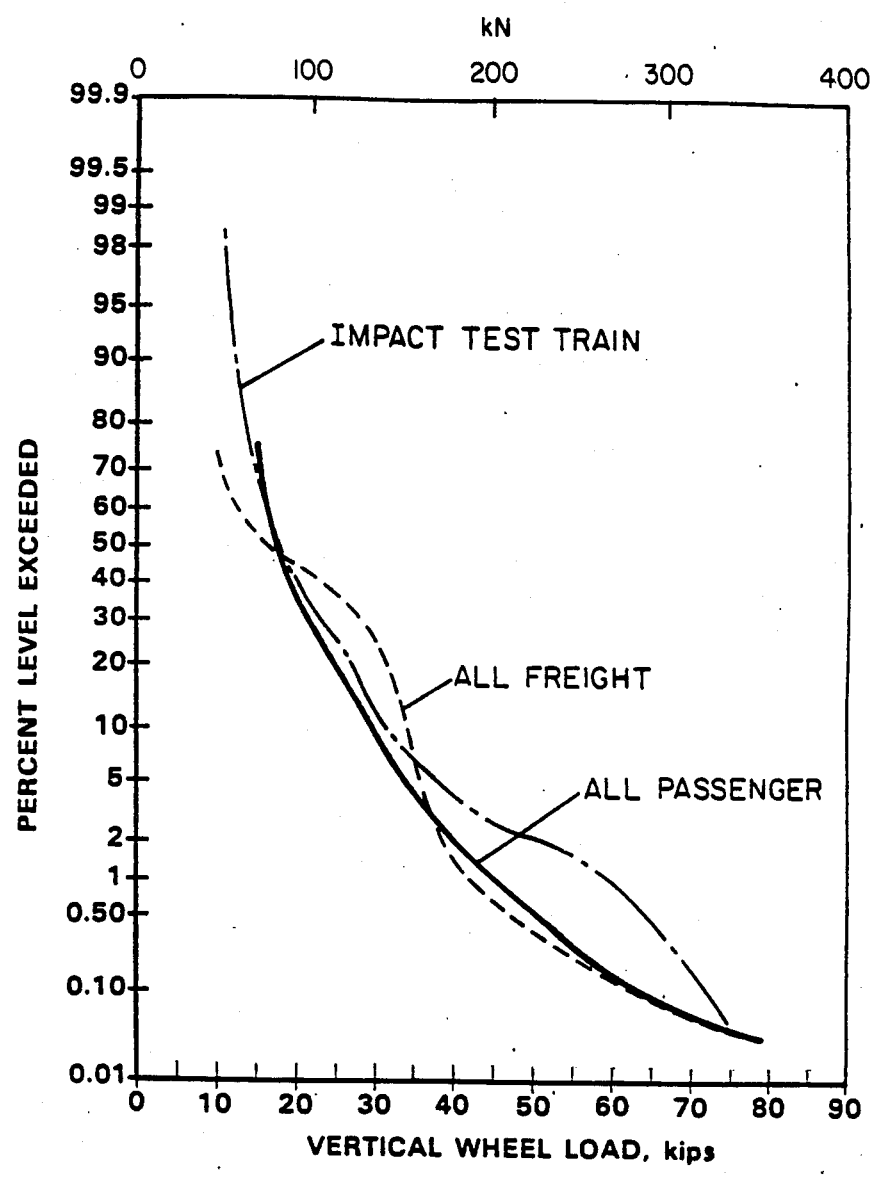
FIGS. 8–13 are graphs presenting typical data, as described therein, obtained with apparatus as in the present invention.
Figure 9:
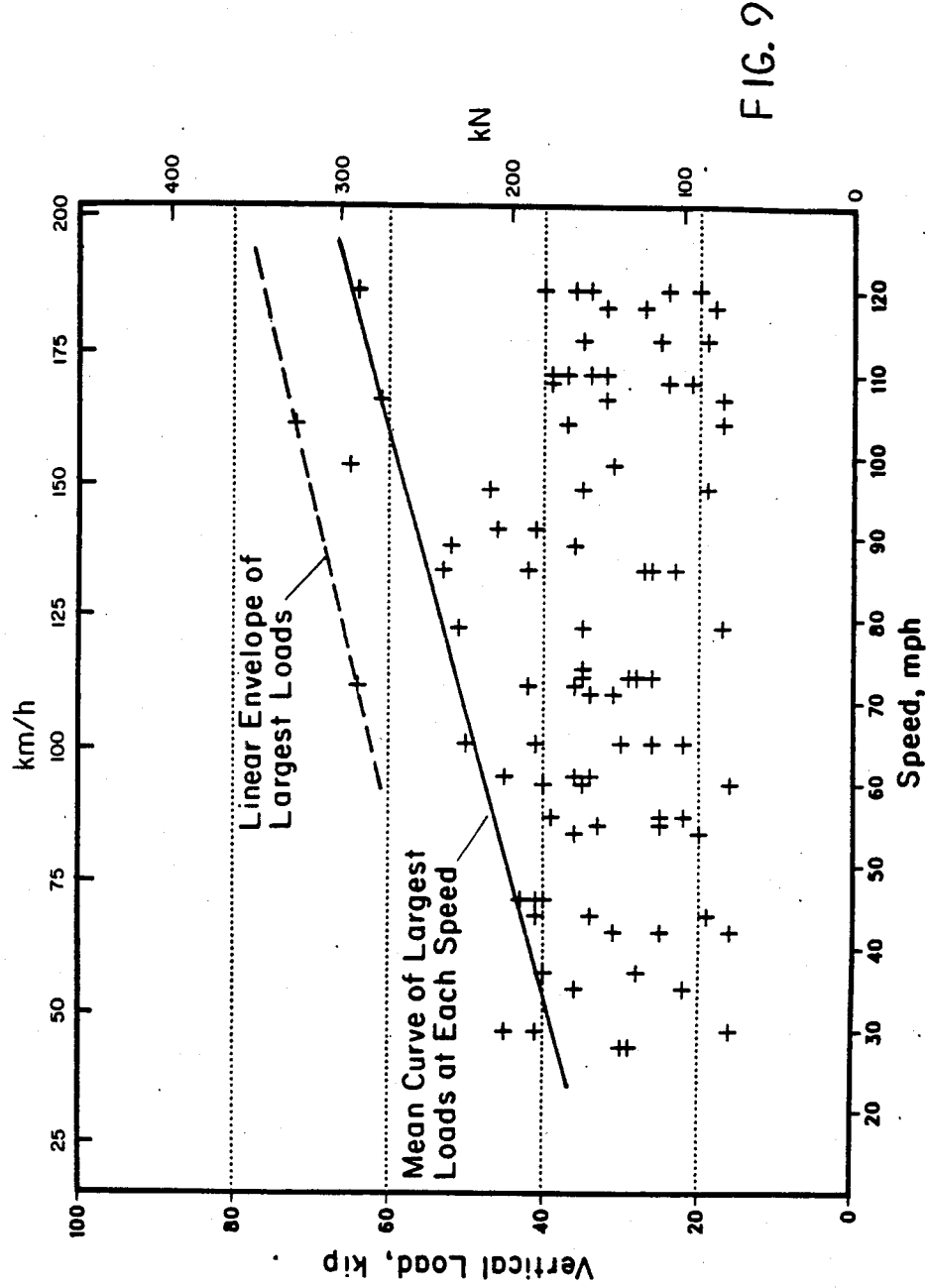
Figure 10:
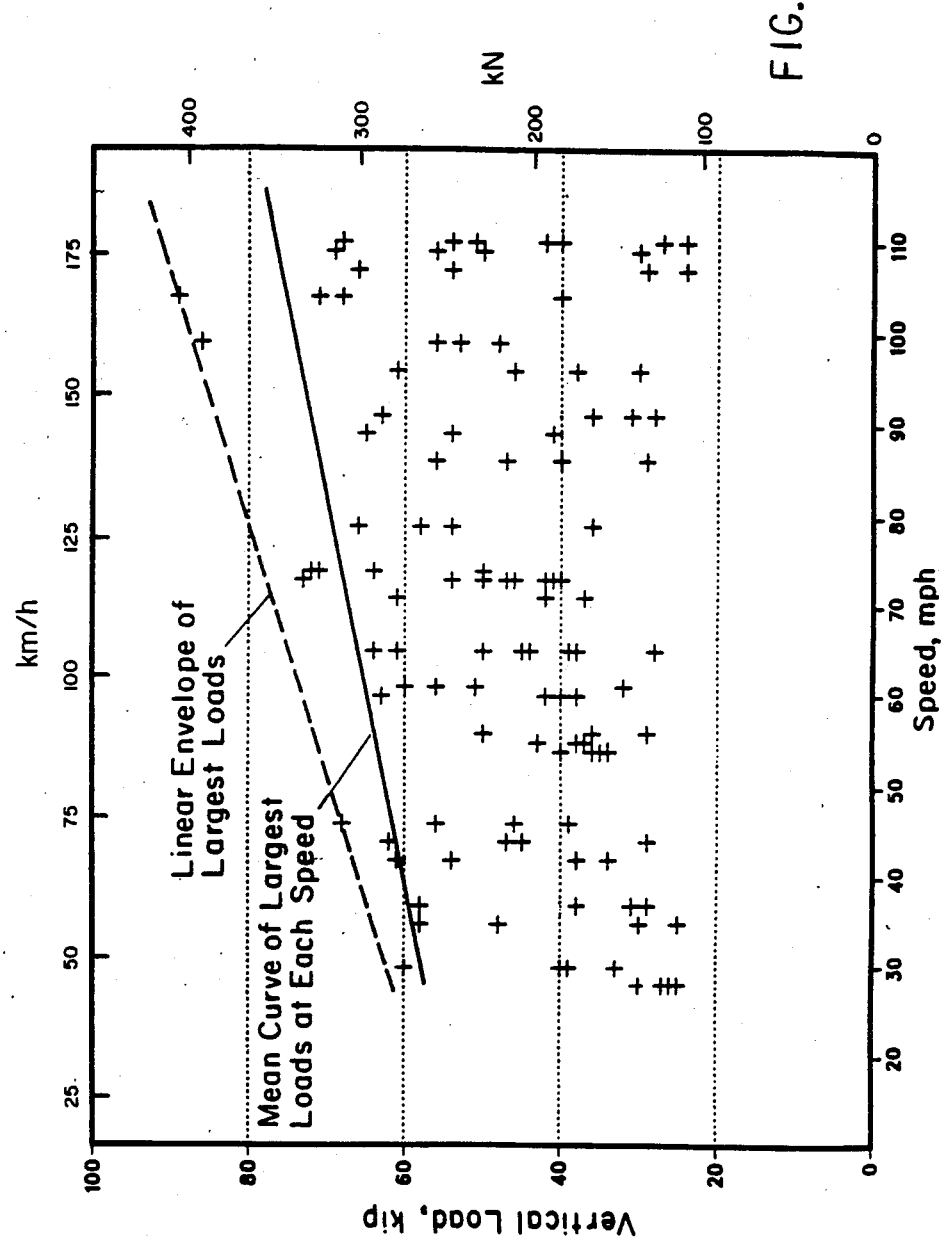
Figure 11:
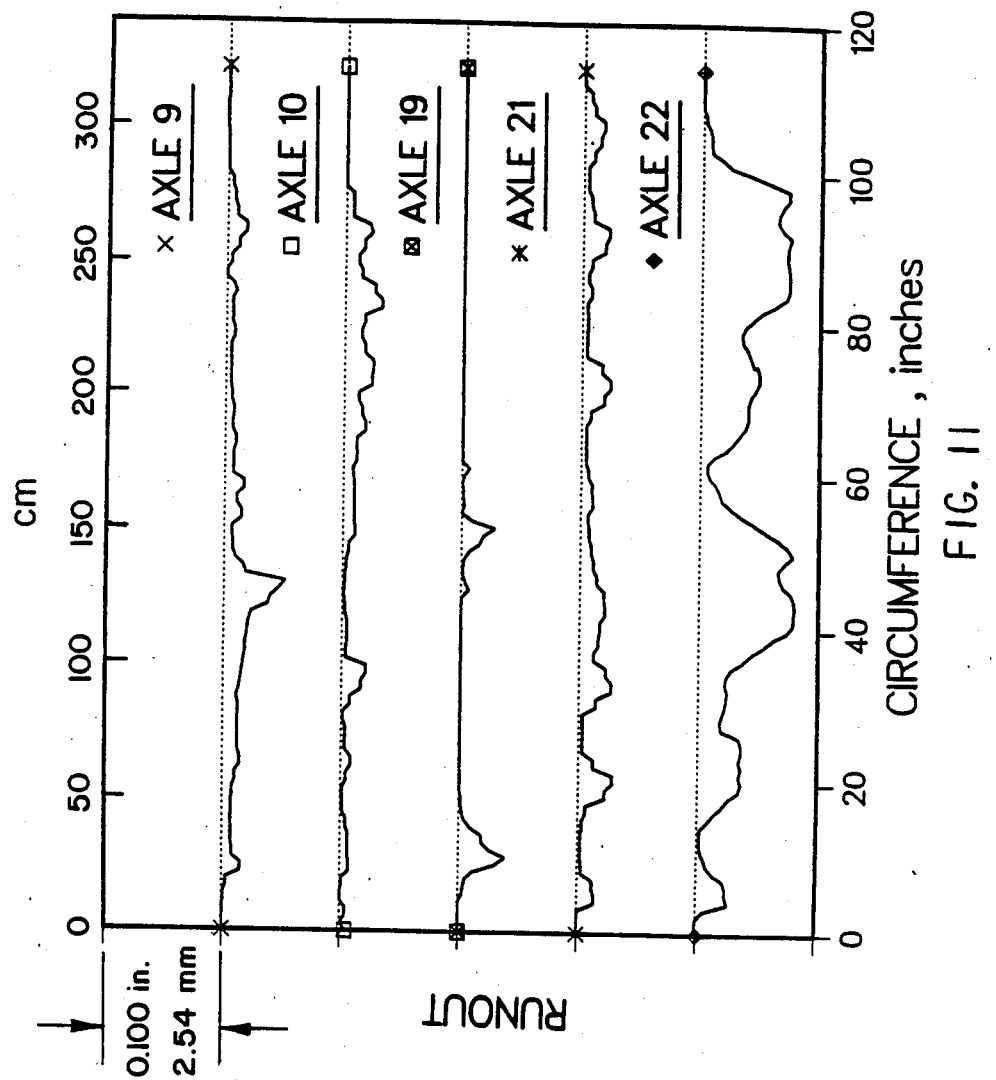
Figure 12:
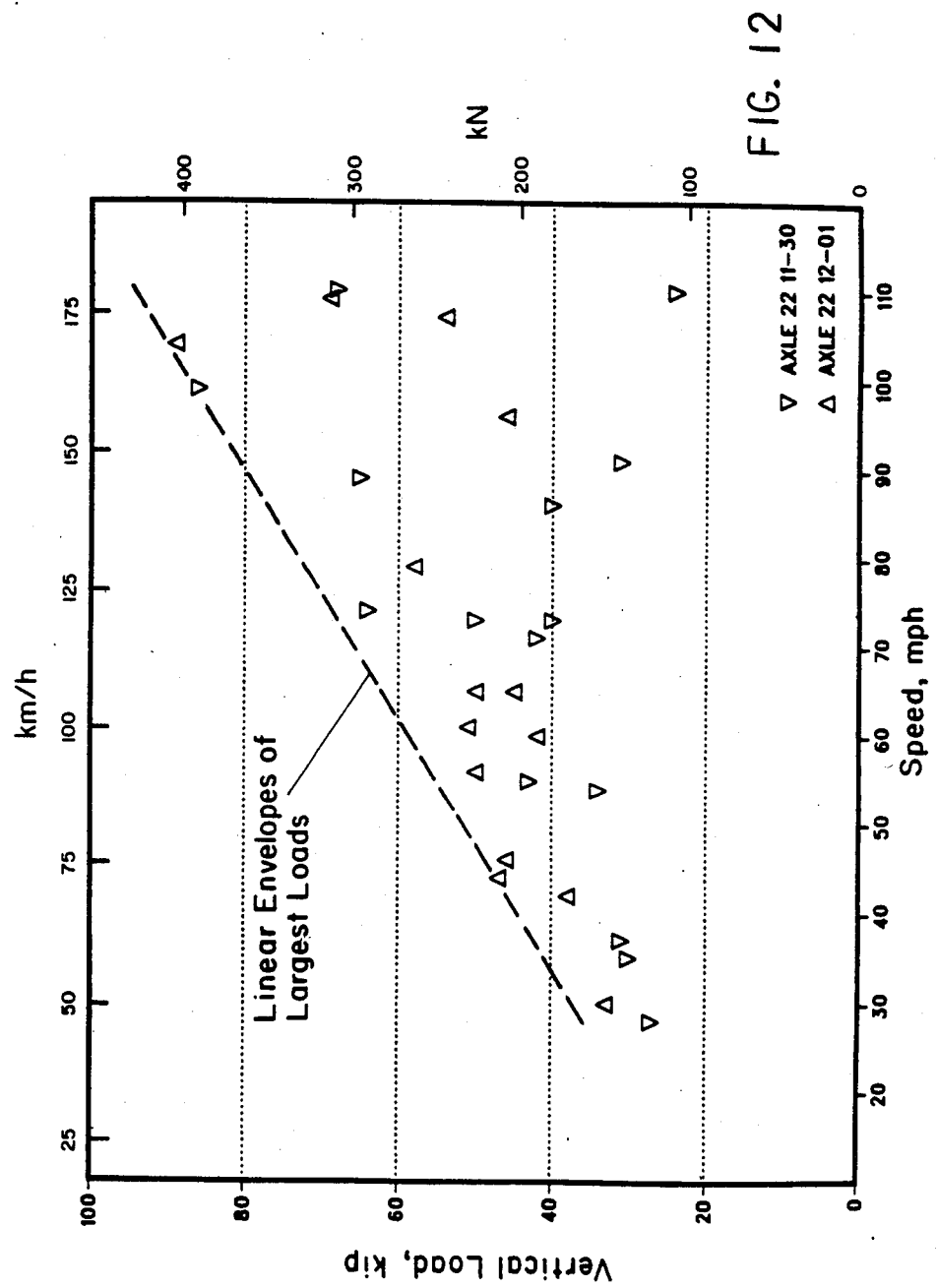
Figure 13:
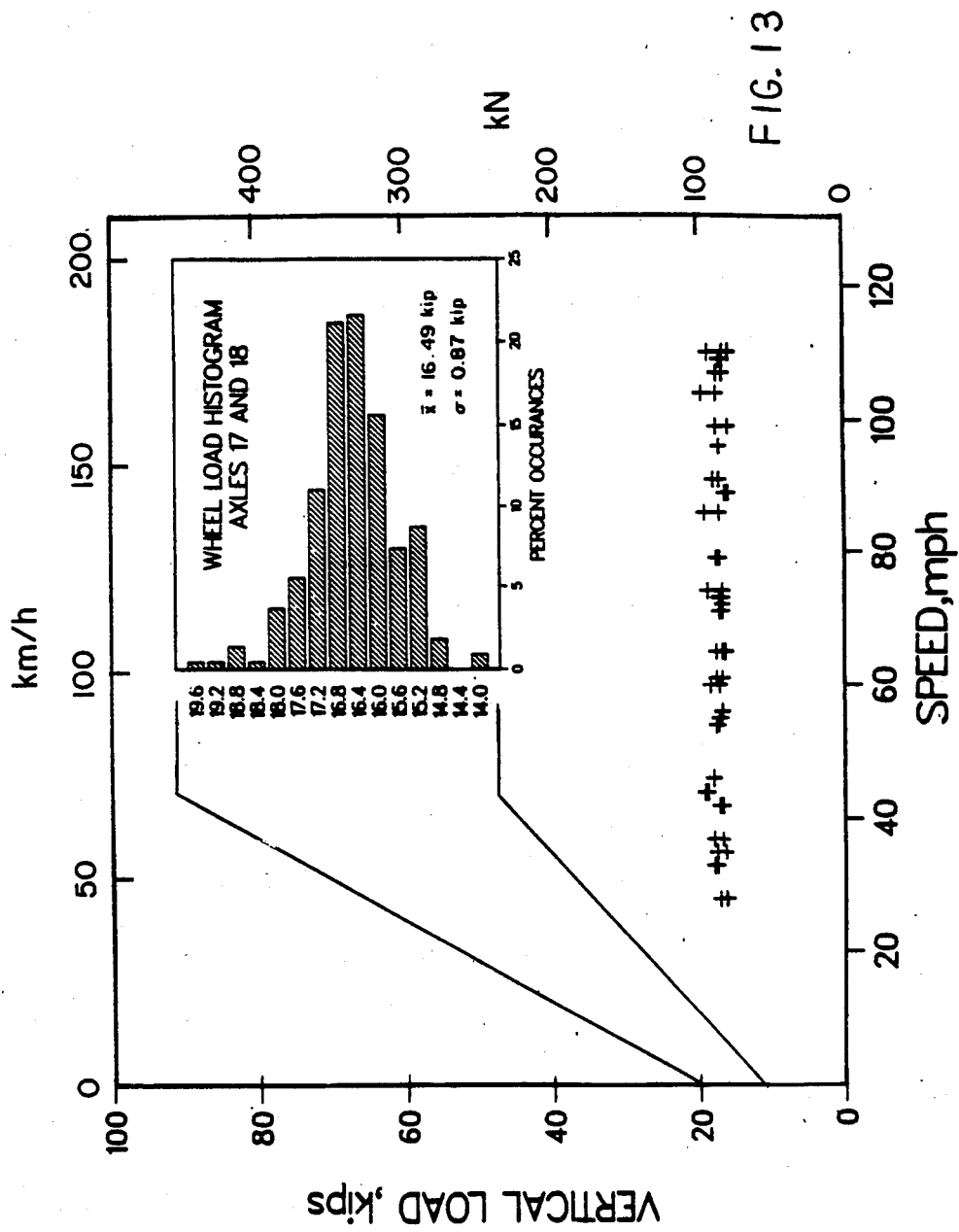
Figure 17:
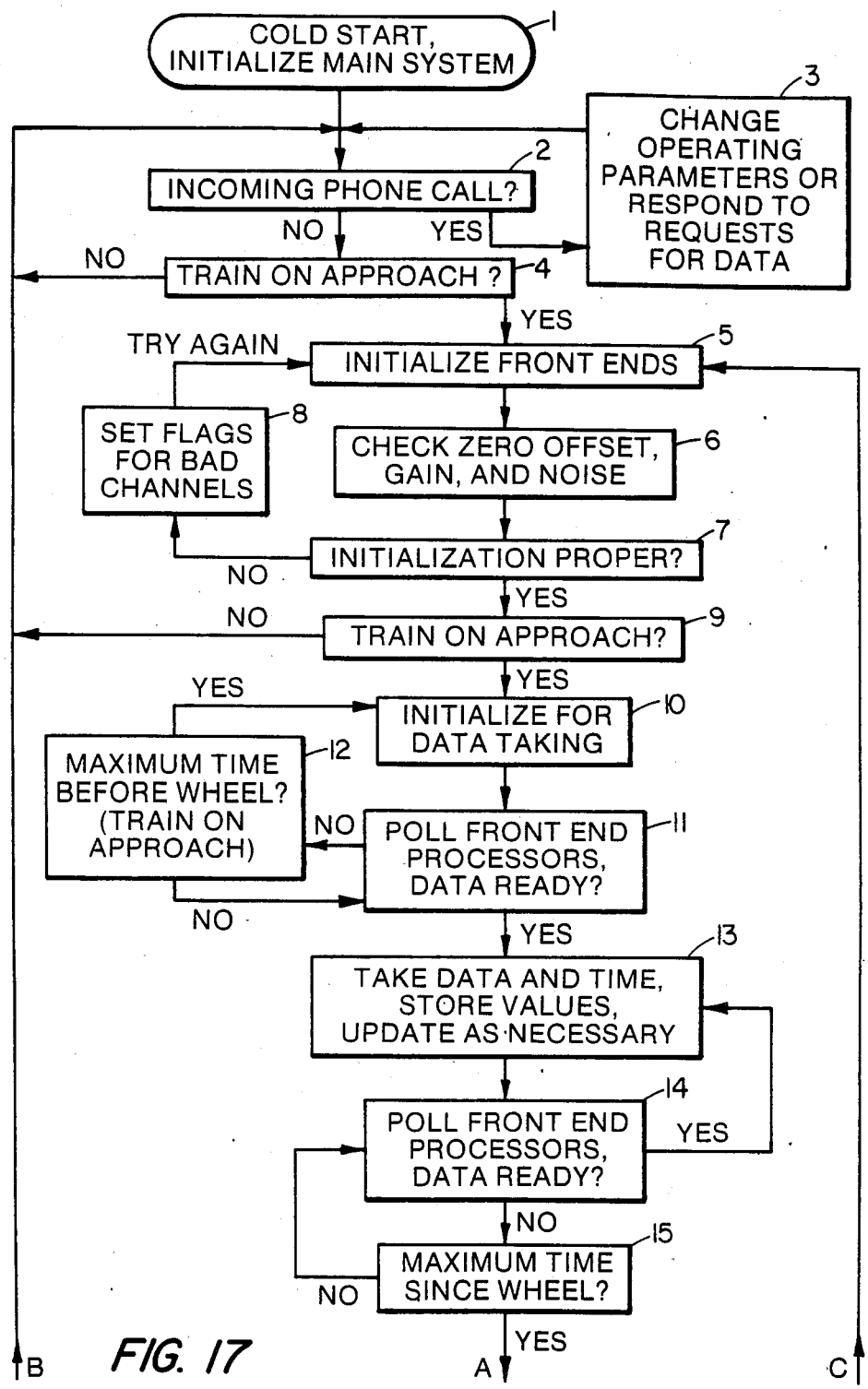
Figure 18:
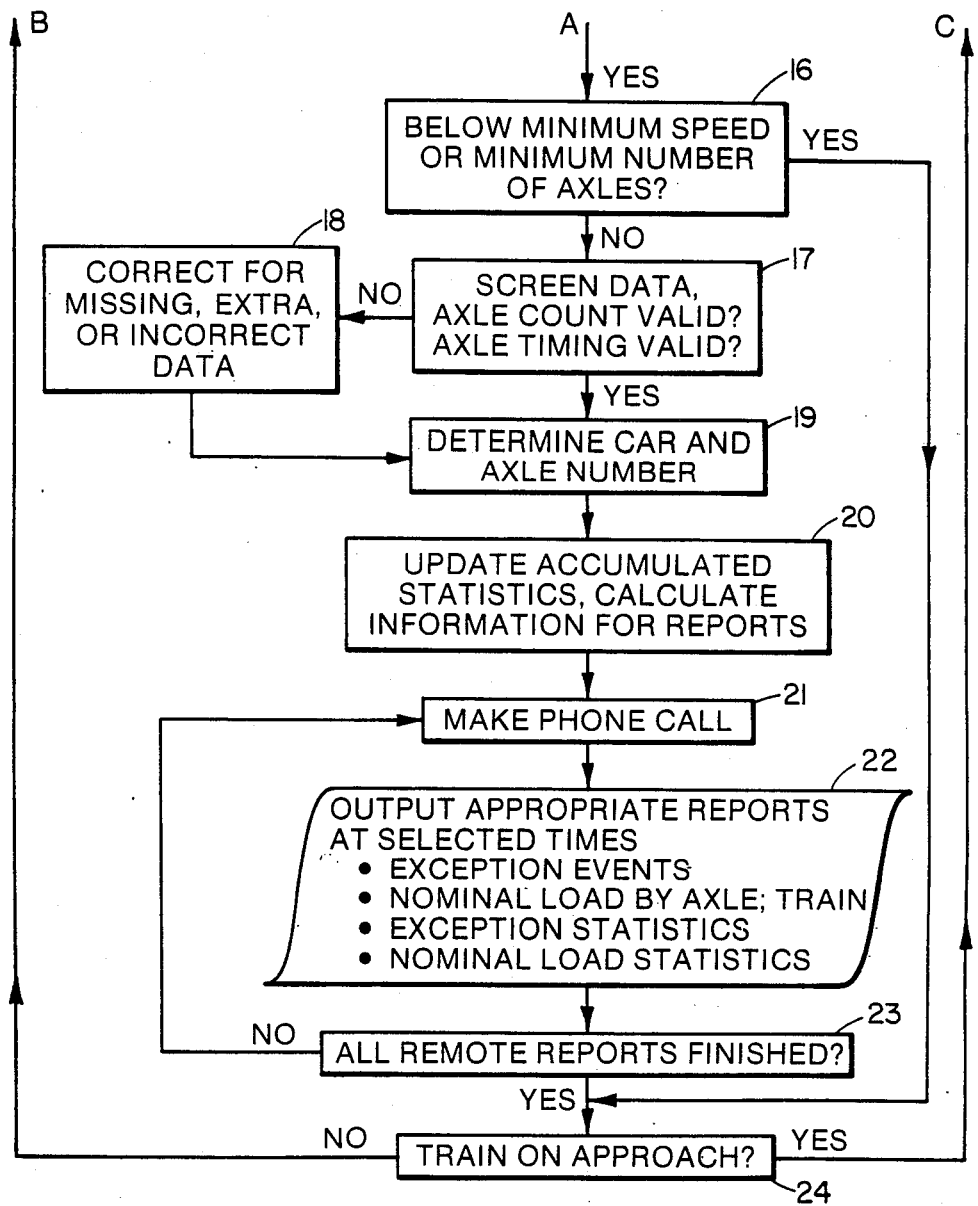

FIGS. 17 and 18 together form a flow chart illustrating typical operation of the "master" computer (back end) in apparatus as in FIG. 6.

Figure 19:
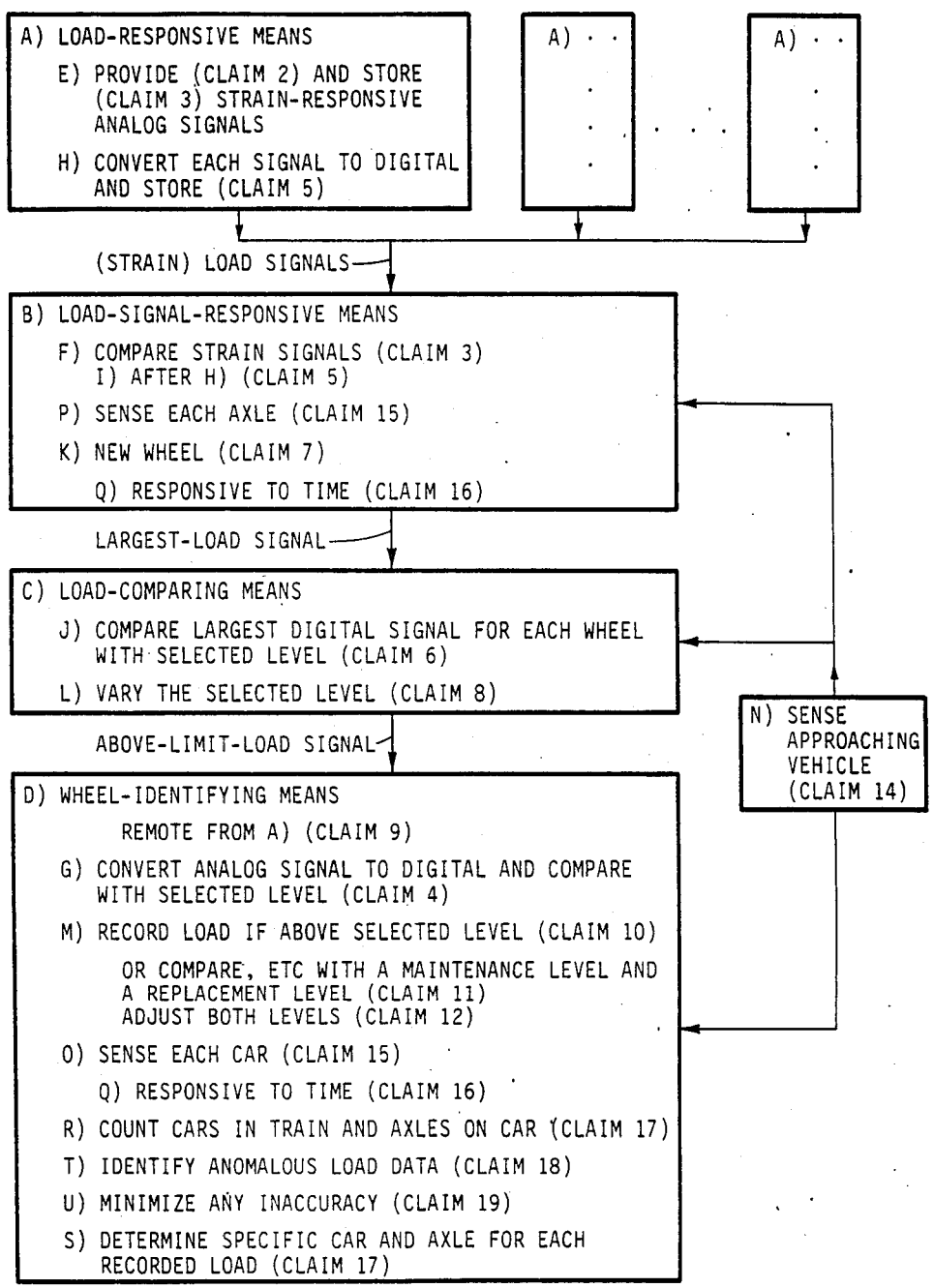

FIG. 19 is a block diagram illustrating typical apparatus according to the invention, and identifying the subject matter therein largely in terminology similar to that of the claims.

CARRYING OUT THE INVENTION

Referring now to FIG. 6, typical apparatus according to the present invention for measuring loads transmitted via wheels to a track from vehicles travelling thereon, comprises means responsive to load at a plurality of approximately equally spaced locations on a selected portion of the track at least about equal in length to the circumference of a typical wheel passing thereover, for providing a signal that is a function of the largest load on the track from each wheel, means responsive to the signal for comparing each largest load with at least one selected load level, and means responsive to the load comparing means for identifying each wheel from which any load greater than a selected level was transmitted.

Typically each load responsive means comprises means for providing an analog signal responsive to the strain on the track, and means for comparing each signal with the largest earlier signal for the same wheel. The load comparing means may comprise means for converting the largest analog signal for each wheel to a digital signal and means for comparing it with a digital signal corresponding to a selected load level.

Alternatively, the load responsive means may include means for converting each analog signal to a digital signal, and then the load comparing means may comprise means for comparing the largest digital signal for each wheel with a digital signal corresponding to a selected load level.

The load responsive means typically comprises means for determining when a load at a given location is from a different wheel than the wheel that transmitted the last previous load there. The load comparing means typically comprises means, remote from the load responsive means, for varying each selected load level. The identifying means comprises means, remote from the load responsive means, for recording the largest load from each wheel that has transmitted a load greater than a selected level.

Typically a first selected load level is set at a value useful for warning that a wheel is approaching a condition needing maintenance and a second selected load level is set at a value indicating that a wheel should be replaced immediately. The values usually are adjusted to provide a balance between unnecessary preventive maintenance and inadequate protection from damage. For use with typical railway vehicles and track during normal operation, the first load level typically is about 45 to 55 kips and the second load level is about 65 to 75 kips.

The load responsive means typically comprises means, responsive to the approach of a vehicle on the track toward the selected portion thereof, for automatically putting the apparatus in a predetermined initialized state for effective operation.

For use with typical railway vehicles, wherein the load responsive means typically comprises means for recognizing the presence of each individual car in each train of vehicles and means for recognizing the presence of each individual axle on each car. The car recognizing means and the axle recognizing means typically comprise means responsive to the times when loads are present; and the wheel identifying means typically comprises means for counting the number of cars in each train and the number of axles on each car, and means responsive to the counting means for determining the specific car and axle thereon from which each load greater than a selected level was transmitted.

Typically the time responsive means comprises means for identifying missing, extraneous, and other anamalous load data; and the anomalous data identifying means comprises means for minimizing any inaccuracy from such anomalous data.

Figure 14:
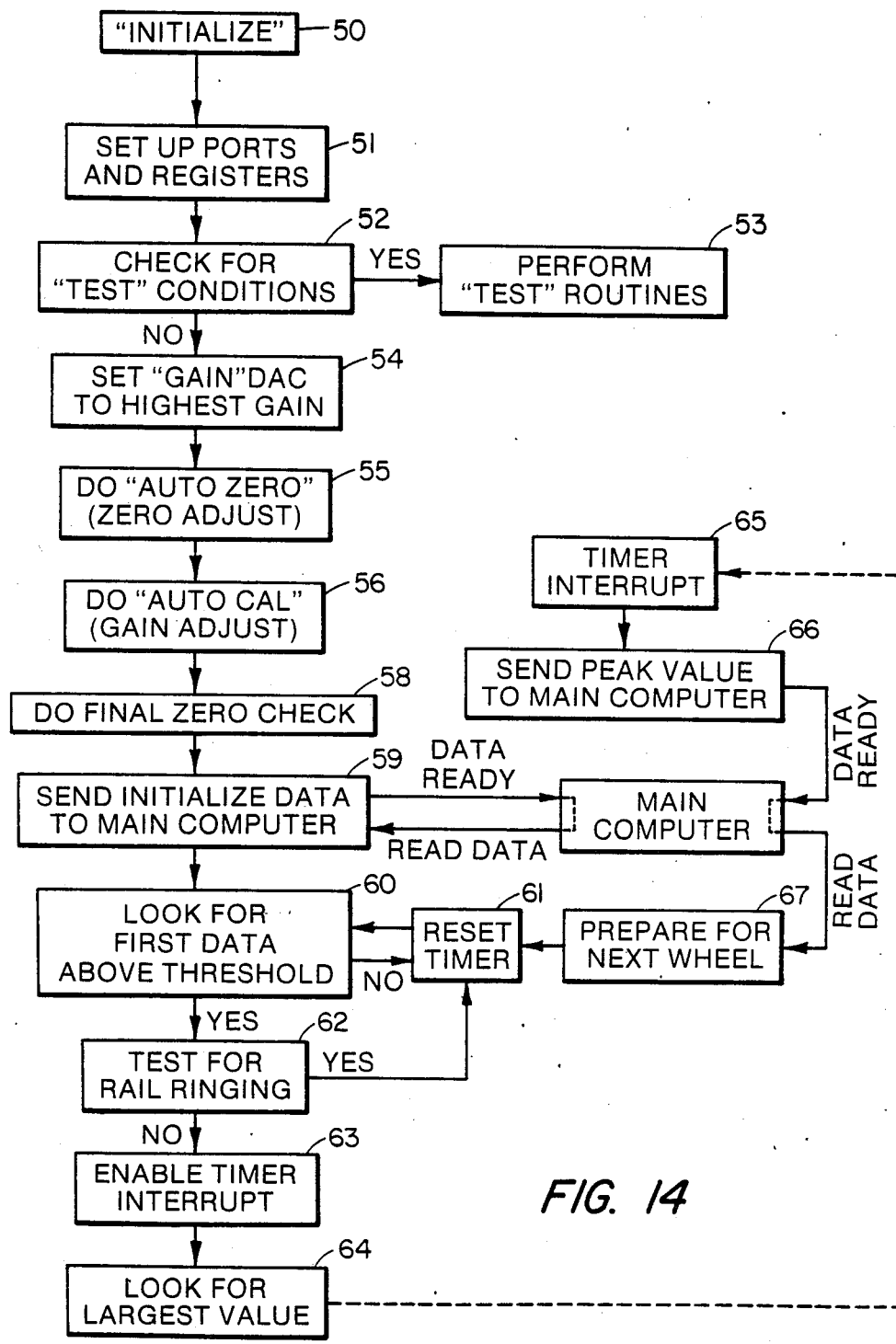
FIG. 14 is a flow chart illustrating typical operation of apparatus as in FIGS. 6, 15, and 16.

The data acquisition task of the apparatus is performed by a number of front end processors as in FIG. 6. A flow chart showing the operation of a single channel is shown in FIG. 14, which represents the respective means for, and steps of, performing the functions 50–67 called for therein. A schematic of a typical front end processor is shown in FIGS. 15 and 16. A description of the operation of a single front end processor follows.

The load measuring circuit 30 is powered by an isolated power supply 31. The output from the load measuring circuit 30 is sensed and amplified by an optocoupled amplifier 32 to the main analog stage 33,34,35 of the front end processor where it is filtered by a 1700 Hz 5 pole low pass filter 33, balanced by the offset digital to analog converter (DAC) and associated circuitry 34, and amplified to the preferred operating level by the gain DAC and associated circuitry 35.

The microcomputer 36 adjusts zero balance and gain each time the front end processor is initialized, thereby correcting for temperature drift and aging, and allowing for wide tolerances on the individual components used in the front end. The output from the microcomputer 36 is directed to the output display 37 and the 3 state bus driver 38. The output from the 3 state bus driver 38 is connected to the opto-isolated data bus 39 which is connected with the master computer (sometimes refered to as the "main" computer) as in FIG. 6.

Each front end program runs independently of all others and continually executes the program described by the flow chart in FIG. 14. Control of each front end processor is performed by the master computer. Upon receiving an "initialize" command, step 50, from the master computer, the front end microcomputer 36 performs setup functions which define hardware and software parameters, step 51. A test is then performed which determines if the front end processor board has been manually placed into a test configuration, step 52. If a test configuration is indicated, then a specified test sequence is performed, step 53. If the operate configuration is selected, then the initialization process begins by setting the gain to the largest expected value, step 54. The combined effects of offset throughout the analog circuit are then nulled, step 55, using the circuitry 34. The calibration relay 40 in FIG. 15 is then closed, and the gain is adjusted to a normalized value, step 56, by reading the deviation from zero in circuit 30 caused by shunting in the calibration resistor 41 and using circuitry 35 to adjust the gain.

The calibration resistor 41 then becomes the independent reference that determines the final gain. After the final gain is selected by the microcomputer 36, a final check for the zero state is performed, step 58. All zero and gain readings are sampled multiple times and are stored in preparation of sending average and peak readings to the master computer, step 59. The master computer determines whether values sent are within tolerance for proper operation (Task 6, FIG. 17). If out of tolerance, the front end is subsequently ignored for that run.

After initialization is complete, the front end processor then enters the "run" mode and begins sampling the analog input signal, looking for a value above the "wheel present" threshold, step 60.

The peak load for each wheel is acquired by sampling at about 30 thousand times per second. Values initially below the wheel present threshold are ignored. As long as no value above the wheel present threshold has been found, the processor continually resets a hardware interrupt timer, step 61, and looks for a value above threshold, step 60. Once the threshold has been exceeded, the data are checked for rail "ringing", step 62. If ringing is present, then the hardware timer is reset, step 61, and the processor resumes looking for a value above threshold, step 60. If no ringing is present, the timer interrupt is enabled, step 63, and all subsequent data for a fixed time interval are screened for a maximum value, step 64. The time interval is dependent on the predetermined combinations of circuit length, train speed range, and minimum axle spacings. Multiple intervals are available. After the timer interrupt is activated, step 65, the largest value acquired (within the prescribed time after exceeding the initial threshold) is placed into the display 37 and the bus driver register 38, and the "Data Ready" flag is set, step 66. The master computer polls the front ends for Data Ready (Tasks 11 and 14, FIG. 17) flags, and reads each one as it encounters the set flag (Task 13, FIG. 17). The act of reading the data initiates the process of preparing the front end for another wheel passage, step 67.

Details of the master computer operation and front end processor interaction are shown in FIGS. 14, 17, and 18. During operation the display shows all values sent to the master computer and also reflects the status of the front end operation (initialize, test, run).

The operation of the entire wheel detector system is controlled by the master computer, which continually executes a program stored in EPROM. The flow chart shown in FIGS. 17 and 18 (representing both means and steps 1–24) gives an overview of the major task sequence of the operating program. A step-by-step description follows.

1. Cold Start, Initialize Main System

This task is entered during power-up, a front panel reset, a watchdog timer generated reset, or an interrupt generated reset. During this task, system hardware and software are initialized for proper operation.

2. Incoming Phone Call?

This task queries the auto answer modem to determine whether an incoming phone call is present. If no call is present, then control proceeds to task block 4. If a call is present, control proceeds to task block 3.

3. Change Operating Parameters or Respond to Requests for Data

This task is used for user interaction after the system receives a proper logon sequence. Menu driven user options may be selected to change system operating parameters such as the threshold limits, or data output options may be selected to view stored data.

4. Train on Approach?

This task interacts with track signal equipment to determine if a train is on approach. If a train is near, control proceeds to task 5. If no train is indicated on approach, control proceeds back to task 2. Task 2 and task 4 comprises the system idle loop.

5. Initialize Front Ends

This task initializes the front end processors. See front end flow chart (FIG. 14) for details.

6. Check Zero Offset, Gain, and Noise

This task determines the validity of the operational and initialization parameters for the front end processors.

7. Initialization Proper?

If all operational and initialization parameters are valid or a previous attempt to initialize has been made, then control proceeds to task 9; otherwise if all parameters are not valid then control passes to task 8.

8. Set Flags for Bad Channels

This task sets flags to be used by the remaining tasks to identify inoperational front end processors. Control proceeds back to task 5 to make another try at initialization.

9. Train on Approach?

If a train is on approach, control proceeds to task 10; otherwise control goes back to task 2.

10. Initialize for Data Taking

During this task previous data are cleared and parameters are set for data acquisition from the front end processors.

11. Poll Front End Processors, Data ready?

During this task, the front end processors are polled for data. If a data ready condition is indicated then control proceeds to task 13, otherwise control passes to task 12.

12. Maximum Time Before Wheel? (Train on Aproach)

If several minutes pass after a train is indicated to be on approach, with no data ready condition, then this task will transfer control to task 10 to reinitialize the system for data acquisition. Otherwise control proceeds back to task 11.

13. Take Data and Time, Store Values, Update as Necessary

This task performs the data acquisition and updating necessary after a data value is acquired by a front end processor.

14. Poll Front End Processors, Data Ready?

During this task the front end processors are polled for data. If a data ready condition is indicated, control proceeds to task 13; otherwise control passes to task 15. Tasks 13, 14, and 15 comprise the main data acquisition loop for the system.

15. Maximum Time Since Wheel?

This task checks the elapsed time since a load value was indicated by a front end processor. If a sufficient time has elapsed to indicate an end-of-train condition, then control passes to task 16; otherwise the data acquisition loop, tasks 13 and 14, is reentered.

16. Below Minimum Speed or Minimum Number of Axles?

This task tests the acquired data for validity based on train speed and number of axles. If the data are invalid, control passes to task 24. If a vaid train passage was captured then control passes to task 17.

17. Screen Data, Axle Count Valid? Axle Timing Valid?

This task examines the relationships and patterns between axle count, data, and time, to determine whether a consistant set of data was acquired. If it is valid, then control passes to task 19; otherwise control passes to task 18.

18. Correct for Missing, Extra, or Incorrect Data

If inconsistant data were identified in task 17 then this task corrects and/or accounts for the inconsistancies.

19. Determine Car and Axle Number

This task assigns a car number and an axle number to each acquired data value.

20. Update Accumulated Statistics, Calculate Information for Reports

This task performs the data reduction and archival functions necessary to produce and maintain the output reports generated by the system.

21. Make Phone Call

This task controls the system modem and places a phone call to the specified terminal or printer to output designated reports.

22. Output Appropriate Reports at Selected Times

This task generates the appropriate reports as determined by the user selected options which are defined during task 3.

23. All Remote Reports Finished?

This task determines whether the output for the current train passage is complete. If all reports and calls have been made, control passes to task 24. If additional calls are to be made, then control returns to task 21 to place another outgoing call.

24. Train on Approach?

This task determines whether a train is on approach. If a train is approaching, then control passes back to task 5 which restarts the initialization and data acquisition for the system. If no train is present then control passes to task 2, which comprises the system idle loop as described in task 2.

The master computer program as outlined above executes continuously. If any fatal errors or other failures occur, the program will automatically restart and resume system operation unless major hardware failures have occurred. Some types of partial system hardware failures may be tolerated and will be reported automatically during the reporting process.

The following listing, in Pascal, discloses the main features of the program FECPGM developed for the wheel impact detector illustrated in the drawings, omitting only a large section, in the middle of the listing, that deals with various procedures and functions called for in the main program or by other procedures.

```
{$h=2000,Q+}
program fecpgm(input,output);
{

PROGRAM FECPGM  DEVELOPED FOR WHEEL IMPACT DETECTOR

WRITTEN BY J.M. TUTEN AUG-OCT  1984
UPDATED AND REVISED VERSION OF SMAIN FOR USE WITH FREIGHT
BATTELLE COLUMBUS LABORATORIES,COLUMBUS ,OHIO 43201

Copyright © 1984, Battelle Memorial Institute.           } label
 loopstart;

const

{      DEFINE CONSTANTS TO BE USED IN PROGRAM              } noise  =  11;                                    {NOISE LIMIT FOR FRONT END  }
   zerolim =  6;                                    {MAXIMUM ZERO OFFSET ALLOWED}
   maxaxl = 600;                                    {MAXIMUM NUMBER OF AXLES ALLOWED}
   arysze = 605;                                    {DATA STORAGE ARRAY LENGTH      }
   on = true;
   off= false;
   modem = 2;                                       { DEFINE PORT NUMBER       }
   terminal = 3;                                    { DEFINE PORT NUMBER       }
   host = 5;                                        { DEFINE PORT NUMBER       }
   cmodem = 4;                                      { DEFINE PORT NUMBER       }
   nchnl = 8;
   revmesg = '   SOUTHBOUND TRAIN   ';
   frdmesg = '   NORTHBOUND TRAIN   ';
   whereat = 'NORTH MIAMI';
   dlowgain = 190;                    { DEFAULT LOW GAIN EXCEPTION LIMIT  }
   dhighgain = 220;                   { DEFAULT HIGH GAIN EXCEPTION LIMIT }
   dlowofset = 60;                    { DEFAULT LOW OFFSET EXCEPTION LIMIT  }
   dhighofset = 200;                  { DEFAULT HIGH OFFSET EXCEPTION LIMIT }
   minspeed = 15;                     { MINIMUM VALID SPEED FOR A TRAIN     }
   dblspeed = 25;              { SPEED AT WHICH CHECKING FOR DOUBLES STARTS }
  password = 'Wflat';

type                  (    DEFINE DATA TYPES          )

word = -32768..32767;
byte = -128..127;
stringn = packed array[1..20] of char;
ary20 = array[1..20] of real;
string8 = string[8];
string2 = string[2];

{$e}
var                    {DEFINE VARIABLES      }

( INTERRUPT VARIABLES   )
    online : boolean;                              { CALL STATUS FLAG }
    relay  : boolean;                               {RELAY STATUS FLAG }

{HARDWARE ADDRESSES          }
       invect [origin 16#fffe81] : char;           {RESTART  INTERRUPT VECTOR }
       timer [origin 16#fffc00]: array [0..16#7f] of char;    {PI/T REGISTERS}
```

```
databus  [origin 16#fffc51]: char;              {CHANNEL 1-4 DATABUS      }
t2status [origin 16#fffc35]: char;      { SHORT RANGE TIMER STATUS FLAG  }
serport2 [origin 16#ff0023] : char;             {SP1A MODEM               }
serport3 [origin 16#ff0003] : char;             {SP2A TERMINAL            }
serport4 [origin 16#ff0023] : char;             {SP1A CMODEM              }
serport5 [origin 16#ff0007] : char;             {SP2B HOST                }

{ARRAYS                                 } axle    : packed array [1..8, 1..arysze] of char;  {DATA STORAGE ARRAY }
    time    : packed array [1..3, 1..8, 1..arysze] of char;  {TIME STORAGE }
    nomload : packed array [1..arysze] of char;        {NOMINAL LOAD STORAGE }
    maxload : packed array [1..arysze] of char;        {MAXIMUM LOAD VALUE   }
    carno   : array [1..arysze] of word;               {CAR NUMBER IN TRAIN  }
    slope   : array [1..arysze] of word;         {SLOPE OF CRIBTIME INTERVALS }
    axcnt   : array [1..8]    of word;                 {ACTUAL AXLE COUNT    }
    functproc: array[1..8] of byte;         { LIST OF FUNCTIONAL PROCESSORS  }
    tempstat : array[1..17,1..7,1..2] of integer;      { STAT WORK ARRAY     }

{ BYTE AND WORD VARIABLES               } i   :   byte;                       { GENERAL COUNTER                }
        j   :   byte;                       { GENERAL COUNTER                }
        k   :   word;                       { GENERAL COUNTER                }
        m   :   byte;                           { COUNTER VARIABLE           }
        ic  :   byte;                       { SITE COUNTER                   }
        numproc   : byte;                   {PROCESSOR  NUMBER COUNTER       }
        adchnl    : byte;                   {A/D CHANNEL SPECIFIOR           }
        avgaxcnt  : word;                   { AVERAGE AXLECOUNT              }
        wcount    : word;           { EXIT LOOP COUNTER INCREMENT            }
        axno      : word;                   { AXLE NUMBER COUNTER            }
        revsgn    : byte;           {CORRECTION TO SPEED   FOR REVERSE TRAIN }
        frstproc  : byte;           {FIRST PROCESSOR TO SEE WHEEL            }
        readnbr   : byte;                   {READ POINTER                    }
        stornbr   : byte;                   { WRITE POINTER                  }
        day : byte;                         { DAY OF WEEK INDICATOR          }
        cribtime : word;            { COUNTS FOR ONE CRIB , = 2 FEET         }

{REAL VARIABLES        } speed   : real;                             {    TRAIN SPEED             }
    boxtemp : real;                         {   BOX TEMPERATURE              }

{ LOGICAL VARIABLES    -        } callactive : boolean ;                       {CALL ACTIVE FLAG           }
    redirect   : boolean ;                       {REDIRECT FLAG              }
    hanguphon  : boolean;                        {CALL RETENSION FLAG}
    lprtopt    : boolean;                   {LOCAL PRINT OPTION FLAG         }
    localoutput : boolean;                  {TERMINAL ON-LINE INDICATOR      }
    calcmpt    : boolean;                   {CALL COMPLETION FLAG            }
    test       : boolean;        { FLAG TO INDICATE FRONT PROC NOT RESPONDING}
    chnlflg    : boolean;        { FLAG TO INDICATE DATA ACQUIRED            }
    modemans,modemcall,modemin,modemout :text;              { PORTS }
    allvalid   : boolean;        { FLAG TO INDICATE ALL AXLE COUNTS VALID   }
    timestr,datestr,dofw  : string8;               { TIME AND DATE           }
    revsflg    : boolean;        {CHANNEL FLAG TO CHECK FOR REVERSE TRAIN    }
    reverse    : boolean;              { FLAG TO INDICATE REVERSE TRAIN      }
    gotime     : boolean;        { FLAG TO INDICATE WEEKLY DUMP              }
```

{$e}

{                DEFINE VARIABLES STORED IN BBRAM                    }

```
    baudvar[origin 16#60000]: array[1..4] of char;{ TIMER BAUD RATE SETTING}
    level1[origin 16#60010]: real; {      BBRAM LOWER THRESHOLD  }
    level2[origin 16#60014]: real; {      BBRAM UPPER THRESHOLD  }
                        {NUM OF DIGITS IN PHONE NUMBER }
    numdigit[origin 16#60018] : array[1..4] of byte;
    number[origin 16#6001C]  : array[1..4] of stringn;    {PHONE NUMBER }
                    {STATUS OF PRINT ERRORS}
    printerr[origin 16#60070] : array[0..4] of boolean;
                {FLAG TO INDICATE WEEKLY DUMP     }
    wkflag [origin 16#60076]    : array[0..4] of boolean;
                {DAY OF WEEK TO MAKE WEEKLY DUMP}
    wkday [origin 16#6007C]      : array[0..4] of byte;
                {TIME OF DAY TO MAKE WEEKLY DUMP}
    wktime [origin 16#60082]    : array[0..4] of byte;
    numphone [origin 16#60078]  : byte;       { NUMBER OF CALLS TO MAKE }
                { REPORT DUMP SCHEDULE FLAGS  }
    rptdump [origin 16#6008B]   :array[1..4,0..4] of boolean;
                    {LOWER LIMIT FOR CAL VALUE }
    lowgain  [origin 16#600A0] : array [1..8] of word;
                    {UPPER LIMIT FOR CAL VALUE }
    highgain [origin 16#600C0] : array [1..8] of word;
            {FLAG TO DISABLE SINGLE PROCESSOR STATS AND EXCEPTIONS}
    proc_on [origin 16#600E0] : array[1..8] of boolean;
            { FLAG FOR AUTOMATICALLY RESETING WEEKLY DUMP FLAGS  }
    autoflg [origin 16#600EA] : array[0..5] of boolean;
            { ENDING TIME FOR STATISTICAL DATA IN STORAGE     }
    endtime [origin 16#60100] : array[1..2] of string8;
            { ENDING DATE FOR STATISTICAL DATA IN STORAGE     }
    enddate [origin 16#60120] : array[1..2] of string8;
            { BEGINNING TIME FOR STATISTICAL DATA IN STORAGE   }
    bgtime [origin 16#60140] : array[1..2] of string8;
            { BEGINNING DATE FOR STATISTICAL DATA IN STORAGE   }
    bgdate [origin 16#60160] : array[1..2] of string8;
    dyninc1 [origin 16#60180] : real ;     { LOWER LOAD THRESHOLD RATIO }
    dyninc2 [origin 16#60184] : real ;     { UPPER LOAD THRESHOLD RATIO }
                    {LOWER LIMIT FOR OFFSET VALUE }
    lowofset [origin 16#60188] : array [1..8] of word;
                    {UPPER LIMIT FOR OFFSET VALUE }
    highofset [origin 16#601A8] : array [1..8] of word;
    tlines  [origin 16#601B8] : byte;           { page counter   }

{STATISTICAL STORAGE}
{           array elements are as follows:                          }
{    array[ load index,speed index,peak/avg index,current/archival index]  }
    bbstat [origin 16#60200] : array[1..16,1..6,1..2,1..2] of integer;
```

{π}

{    EXTERNAL AND LIBRARY FUNCTIONS        }

```
function bittest(a,b : char ) : boolean; forward;
function andb(a,b : char) : char;forward;
function orb(a,b : char) : char;forward;
function shlb(a,b : char) : char;forward;
function shrb(a,b : char) : char;forward;
```

```
function notb( b : char) : char;forward;
function double(a : char) : word;forward;
function counts(a,b,c : char) : integer;forward;
procedure gomon; forward;
procedure setstat(val:byte);forward;
procedure setvect;forward;
procedure enable; forward;
procedure termbaud;forward;

{$E}
function ckdcd(srport : byte) : boolean;

{ ************************************************************* }
{    NAME    CKDCD                                              }
{    PURPOSE   FUNCTION CKDCD TESTS FOR  DCD  ON SERIAL PORT    }
{                                                               }
{                                                               }
{    WRITTEN 10-1-84    jim tuten                               }
{    GLOBAL VARIABLES REQUIRED       none                       }
{    EXTERNAL ROUTINES REQUIRED                                 }
{         bittest                                               }
{                                                               }
{    EXTERNAL REFERENCES OR VARIABLES                           }
{        srport - variable to select proper port to test        }
{                                                               }
{    HARDWARE REQUIREMENTS                                      }
{        VME8300    quad serial board located at address ff0000 }
{                                                               }
{    FILES USED      none                                       }
{    PORTS USED      serial ports 2,3,4,5 on quad board         }
{    REMARKS                                                    }
{      This routine uses the dcd signal to determine state of peripheral }
{      devices. The only active input sense line for the serial cards    }
{      as supplies so dcd miust be jumpered if it desired to sense dcd.  }
{                                                               }
{ ************************************************************* } var register : char;
serport2 [origin 16#ff0023] : char;        { MODEM    }
serport3 [origin 16#ff0003] : char;        { TERMINAL }
serport4 [origin 16#ff0023] : char;        { CMODEM   }
serport5 [origin 16#ff0007] : char;        { HOST     } begin case srport of
```

In the complete listing of this program FECPGM, filed as an appendix to this specification, 61 more pages of procedures and functions are included here. A number of externally called assembly language procedures, functions, library routines, and software drivers have not been included in the appendix but are required for proper system operation. Details of these assembly language routines may be found in open specifications for the hardware.

```
                     dumpflg
   else if opt='ERRPT'  then
                     errrpt
   else if opt='GAINL'  then
                     cal_limit
   else if opt='OFSET'  then
                     oft_limit
   else if opt='DLCNL'  then
                     killproc
   else if opt='VWALL'  then
                     report1
   else if opt='VEXCP'  then
                     report2(0)
   else if opt= 'CBAUD' then
                     chgbaud(300,true)
   else if opt='INVAL'  then
                     report5
   else if opt='ARCHV'  then
                     transtat
   else if opt='PSTAT'  then
                     begin
              writeln(modemout,' THIS OPTION LISTS A COMPLETE STATISTICS TABLE');
              writeln(modemout,' DO YOU WANT CURRENT OR ARCHIVAL STATISTICS ?');
              writeln(modemout,' ENTER "1" FOR CURRENT, "2" FOR ARCHIVAL     ');
                     readln(modemin,ptr);
                     report3(ptr)
                     end
   else if opt= 'TLMGT' then
                     begin
              writeln(modemout,' THIS OPTION PRINTS CUMMULATIVE LOAD. DO YOU');
              writeln(modemout,' WANT THE CURRENT OR ARCHIVED LOAD TOTALS ? ');
              writeln(modemout,' ENTER "1" FOR CURRENT, "2" FOR ARCHIVAL    ' );
                     readln(modemin,ptr);
                     report4(ptr)
                     end
   else if opt= 'ZSTAT' then
                     begin
              writeln(modemout,' THIS OPTION ZEROES STATISTICS TABLE. DO YOU  ');
              writeln(modemout,' WANT TO ZERO CURRENT OR ARCHIVAL STATISTICS ?');
              writeln(modemout,' ENTER "1" FOR CURRENT, "2" FOR ARCHIVAL    ' );
                     readln(modemin,ptr);
                     zerostat(ptr);
                     end
   else if opt= 'EXITT' then
                     begin
                 {  do nothing  sets up exit  }
                     end
   else
                     writeln(modemout, '       INVALID COMMAND REENTER OPTION ');

end
end;

{$E}

{                       START OF MAIN PROGRAM begin writeln(' !!!!!!!! HERE I AM !!!!!!!!');
reset(modemin,'#PRT2');              { define ports    }
```

```
reset(modemans,'#PRT4');
rewrite(modemout,'#PRT2');
rewrite(modemcall,'#PRT4');
localoutput := false;
hanguphon := true;
callactive := false;
online := true;
redirect   := false;
relay := false;
lprtopt := true;
initpi_t;
invect := chr(16#1A);          {INIT RESTART VECTORS    }
setvect;
 enable;
   frtinit;

writeln;
        writeln( 'Following Processors are Functional');
           for i := 1 to numproc do
              begin
              write(functproc[i])
              end;
           if numproc =0 then
              begin
              writeln( '      NONE      ');
              writeln(modemout);
              writeln(modemout,' NO FUNCTIONAL PROCESSORS   ');
              writeln(modemout)
              end;
        writeln;

{$e}
     {     START OF THE MAIN DATA ACQUISITION LOOP     } wait(250,true);                          { start 4 miniute timer  }
loopstart:                               { start of main loop     }
relay := ckrelay;
if relay then
   frtinit;
relay := ckrelay;

{  TRAIN IS NEAR RELAY ACTIVE LOOP     }
if relay then
   begin
   WRITELN(' RELAY ACTIVE LOOP ENTERED');
   for j := 1 to 8 do
      for i := 1 to arysze do           { zero data arrays     }
         axle[j,i] := chr(0);
   frtclear;                            { clear all stray channel flags }
   if hanguphon then
      begin
      if ckdcd(modem) then              { if online send message train near }
         writeln(modemout,'!!!!!!!!!!  RELAY ACTIVE  !!!!!!!!!!!')
      else
         setdtr(off,modem);             { prevent answering incoming calls  }
      end;

acquire;                  { acquire data     }
   timedat;                  { get time and date }
```

```
   noreset;                  { spin plate          }
   screen;                   { screen data         }
   speed := calspeed;
      writeln(' Train Speed is ',speed : 4 :0,' MPH ');   { speed valid }
   findcar;                  { find car numbers    } if (speed < dblspeed ) then
      begin
      remvdbl;               { remove double wheel pulses  }
      screen
      end;

if reverse then
      begin
      writeln;
      writeln(revmesg);
      end
   else
      begin
      writeln;
      writeln(frdmesg);
      end;

{$e}           { TEST FOR VALID TRAIN  } if (((avgaxcnt > 3) and (speed > minspeed ) or (numproc = 1 ))
                                      and (numproc <> 0)) then
   begin
   bbstatupdat(1);                        { update statistics            }
   maxminavg;                       { find max min and avg load          }
cktime(wkday[0],wktime[0],gotime);
if (gotime and wkflag[0]) then
   begin
   transtat;                             {transfer statistics to storage }
   zerostat(1);                          { if time is correct            }
   wkflag[0] := false;
   end;

cktime(wkday[0]+1,0,gotime);                    {reset weekly dump flag }
if (gotime and not(wkflag[0]) and autoflg[0]) then  { if autoflg selected }
   wkflag[0] := true;

{ OUTPUT  REPORTS  } for ic := 0 to numphone do
   begin if ((not callactive) and (ic >= 1)) then     { make phone call  }
      callout(callactive,ic);
   if callactive then
      online := true;

{ define proper in-out ports   }
   if (ic = 0) then
      rewrite(modemout,'#PRT3')

else
      rewrite(modemout,'#PRT2');
   if redirect then
      rewrite(output,'#PRT2')
```

```
else
   rewrite(output,'#PRT3');

if rptdump[1,ic] then
   report1;
if rptdump[2,ic] then
   report2(ic);

cktime(wkday[ic],wktime[ic],gotime);
if (gotime and wkflag[ic]) then
   begin
   if rptdump[3,ic] then
       report3(2);
   if rptdump[4,ic] then
       report4(2);
wkflag[ic] := false
   end;
                                               { if autoflag selected }
cktime(wkday[ic]+1,0,gotime);                  {reset weekly dump flag}
if (gotime and (not(wkflag[ic])) and  autoflg[ic]) then
wkflag[ic] := true;
       if hanguphon then      { finished hang up phone    }
          hangup;
       noreset;         { spin plate after call  }
       end;
   end
 else
   begin
   writeln('Invalid Train,Axle Count = ',avgaxcnt,' Speed = ',speed : 4 :0);
   end;
hanguphon := true;      { reset keepcall so option table is reentered }
lprtopt  := true;       { reset lprtopt  so option table is reentered }
 end
else
         { RELAY INACTIVE TRAIN NOT NEAR ; CONTINUAL IDLE LOOP SPENT }
         { CHECKING FOR LOCAL TERMINAL ,INCOMMING CALL, AND RESETTING }
         { PLATE SPINNER                                              }
   begin
   setdtr(on,modem);
   online := false;
   localoutput := ckdcd(terminal);
   if localoutput then
      online := true;
   if (localoutput and lprtopt) then       { terminal is onsite    }
      begin
      reset(modemin,'#PRT3');
      rewrite(modemout,'#PRT3');
         procescall
      end;

callactive := ckdcd(modem);
   if callactive then
      online := true;
   if (callactive and  hanguphon) then      { service call on modem }
      begin
      reset(modemin,'#PRT2');
      rewrite(modemout,'#PRT2');
         procescall
```

```
      end;
   if (ord(t2status) <> 0) then
      begin
         wait(250,true);
         noreset;
         writeln(' Resetting Plate Spinner ');
      end
   end;
   goto loopstart
end.
```

To summarize in the format and terminology of the claims, typical apparatus for measuring loads transmitted via wheels to a track from vehicles travelling thereon, comprises (A) means, such as strain gauges a,b,c,d,a',b',c',d' as in FIGS. 3-5, at each of a purality of approximately equally spaced locations on a selected portion of the track at least about equal in length to the circumference of a typical wheel passing thereover, for providing signals responsive to load at each location, (B) means, typically comprising bridge circuits as in FIG. 5 feeding to optically isolated signal conditioning amplifiers SCA 1, SCA 2, . . . SCA n and front-end processing circuitry as in FIG. 6, FIG. 15, and the circuitry 37 FIG. 16, responsive to the signals from all of the load-responsive means A, for providing a signal that is a function of the largest load on the track from each wheel, (C) means, such as apparatus in FIG. 16 and FIG. 14, block 64, responsive to the largest-load signal from the means B, for comparing each largest load with at least one selected load level, and (D) means, such as apparatus in FIG. 16, FIG. 14, blocks 64–66, and FIGS. 17 and 18, blocks 11–19, responsive to the largest-load-comparing means C, for identifying each wheel from which any load greater than a selected level was transmitted.

Typically each load-responsive means A comprises (E) means, such as apparatus in FIG. 15 and the apparatus 34,35 in FIG. 16, for providing an analog signal responsive to the strain on the track, and each analog-signal-providing means E also stores the strain-responsive signal, as in the microcomputer 36 in FIG. 16, and the largest-load-signal providing means B comprises (F) means, such as the means 64 in FIG. 14, for comparing each strain-responsive signal with the largest earlier such signal for the same wheel.

The load-comparing means D typically comprises (G) means for converting the largest stored strain-responsive analog signal, from the means E, for each wheel to a digital signal and means for comparing the converted signal with a digital signal corresponding to a selected load level, such as the microcomputer 36 and driver 38 in FIG. 16, included in the single chip microcomputer with A/D in FIG. 6, and including the means 20,22 in FIG. 18.

Alternatively, each load-responsive means A may comprise (H) means, included in the microcomputer 36, for converting each analog signal to a digital signal and storing the converted signal, and each largest-load-signal providing means B may comprise (I) means, such as the means 64 in FIG. 14, and the means 20,22 in FIG. 18, for comparing each converted signal with the largest earlier such signal for the same wheel, and then the load-comparing means O typically comprises (J) means, such as the microcomputer 36 and the driver 38 in FIG. 16, included in the single chip microcomputer with A/D in FIG. 6, and including the means 20,22 in FIG. 18, for comparing the largest digital signal from the comparing means I for each wheel with a digital signal corresponding to a selected load level.

The apparatus typically comprises also (K) means, included in the microcomputer 36 and the bus driver 38 in FIG. 16, and the means 60–66 in FIG. 14, for determining when a load at a given location is from a different wheel than the wheel that transmitted the last previous load there.

Typically the load-comparing means O comprises (L) means, remote from the load-responsive means A, as shown to the right of the heavy dashed line in FIG. 6, and including the means 2,3 in FIG. 17, for varying each selected load level.

The wheel-identifying means D typically is remote (as shown in FIG. (6) from the load-responsive means A, and comprises (M) means, such as the RAM and the local readout in FIG. 6 and including the means 13 in FIG. 17, for recording the largest load from each wheel that has transmitted a load greater than a selected level.

Typically, a first selected load level is set at a value useful for warning that a wheel having given properties, on a given type of vehicle, is approaching a condition needing maintenance and a second selected load level is set at a value indicating that such wheel should be replaced immediately. (Apparatus in FIG. 6, including the means 20,22 in FIG. 18.) The values for the selected load levels preferably are adjusted to provide a balance between unnecessary preventive maintenance and inadequate protection from damage, as by the means 3 in FIG. 17. For use with typical railway vehicles and track during normal operation the value set for the first load level typically is about 45 to 55 kips and the value set for the second load level typically is about 65 to 75 kips.

The apparatus typically comprises also (N) means, typically including the parallel I/O means in FIG. 6, the means 50 in FIG. 14, and the means 4–12 in FIG. 17, responsive to the approach of a vehicle on the track toward the selected portion thereof, for automatically putting the apparatus in a predetermined initialized state for effective operation.

Typical apparatus for use with typical railway vehicles comprises also (O) means, in the apparatus of FIG. 6 and typically including the means 17–19 in FIG. 18, for recognizing the presence of each individual car in each train of vehicles, which typically comprises also (P) means for recognizing the presence of each individual axle on each car. P The car-recognizing means O and the axle-recognizing means P typically comprise (Q) means, typically comprising the calendar clock in FIG. 6 and typically including the means 13 in FIG. 17, responsive to the times when loads are present.

The wheel identifying means typically comprises (R) means, typically including the parallel I/O means in FIG. 6, the means 50 in FIG. 14, and the means 4-12 in FIG. 17, for counting the number of cars in each train and the number of axles on each car, and (S) means, in the apparatus of FIG. 6 and typically including the means 20,22 in FIG. 18, responsive to the counting means R for determining the specific car and axle thereon from which each load greater than a selected level was transmitted.

Typically the time-responsive means Q comprises (T) means, in the apparatus of FIG. 6 and typically including the means 17,18 in FIG. 18, for identifying missing, extraneous, and other anomalous load data, which typically comprises also (U) means for minimizing any inaccuracy from such anomalous data.

What is claimed is:

1. Apparatus for measuring loads transmitted via wheels to a track from vehicles travelling thereon, comprising
   (A) means at each of a plurality of approximately equally spaced locations on a selected portion of the track at least about equal in length to the circumference of a typical wheel passing thereover, for providing signals responsive to load at each location,
   (B) means, responsive to the signals from all of the load-responsive means A, for providing a signal that is a function of the largest load on the track from each wheel,
   (C) means, responsive to the largest-load signal from the means B, for comparing each largest load with at least one selected load level, and
   (D) means, responsive to the largest-load-comparing means C, for identifying each wheel from which any load greater than a selected level was transmitted.

2. Apparatus as in claim 1, wherein each load-responsive means A comprises
   (E) means for providing an analog signal responsive to the strain on the track.

3. Apparatus as in claim 2, wherein each analog-signal-providing means E also stores the strain-responsive signal, and the largest-load-signal providing means B comprises
   (F) means for comparing each strain-responsive signal with the largest earlier such signal for the same wheel.

4. Apparatus as in claim 3, wherein the load-comparing means D comprises
   (G) means for converting the largest stored strain-responsive analog signal, from the means E, for each wheel to a digital signal and means for comparing the converted signal with a digital signal corresponding to a selected load level.

5. Apparatus as in claim 2, wherein each load-responsive means A comprises
   (H) means for converting each analog signal to a digital signal and storing the converted signal, and each largest-load-signal-providing means B comprises
   (I) means for comparing each converted signal with the largest earlier such signal for the same wheel.

6. Apparatus as in claim 5, wherein the load-comparing means C comprises
   (J) means for comparing the largest digital signal from the comparing means I for each wheel with a digital signal corresponding to a selected load level.

7. Apparatus as in claim 1, comprising also
   (K) means for determining when a load at a given location is from a different wheel than the wheel that transmitted the last previous load there.

8. Apparatus as in claim 1, wherein the load-comparing means C comprises
   (L) means, remote from the load-responsive means A, for varying each selected load level.

9. Apparatus as in claim 1, wherein the wheel-identifying means D is remote from the load-responsive means A.

10. Apparatus as in claim 1, wherein the wheel-identifying means D comprises
    (M) means for recording the largest load from each wheel that has transmitted a load greater than a selected level.

11. Apparatus as in claim 1, wherein a first selected load level is set at a value useful for warning that a wheel having given properties, on a given type of vehicle, is approaching a condition needing maintenance and a second selected load level is set at a value indicating that such wheel should be replaced immediately.

12. Apparatus as in claim 11, wherein the values for the selected load levels are adjusted to provide a balance between unnecessary preventive maintenance and inadequate protection from damage.

13. Apparatus as in claim 11, for use with typical railway vehicles and track during normal operation wherein the value set for the first load level is about 45 to 55 kips and the value set for the second load level is about 65 to 75 kips.

14. Apparatus as in claim 1, comprising also
    (N) means, responsive to the approach of a vehicle on the track toward the selected portion thereof, for automatically putting the apparatus in a predetermined initialized state for effective operation.

15. Apparatus as in claim 1 for use with typical railway vehicles, comprising also
    (O) means for recognizing the presence of each individual car in each train of vehicles, and
    (P) means for recognizing the presence of each individual axle on each car.

16. Apparatus as in claim 15, wherein the car-recognizing means O and the axle-recognizing means P comprise
    (Q) means responsive to the times when loads are present.

17. Apparatus as in claim 16, wherein the time-responsive means Q comprises
    (T) means for identifying missing, extraneous, and other anomalous load data.

18. Apparatus as in claim 17, wherein the anomalous-data-identifying means T comprises
    (U) means for minimizing any inaccuracy from such anomalous data.

19. Apparatus as in claim 15, wherein the wheel-identifying means D comprises
    (R) means for counting the number of cars in each train and the number of axles on each car, and
    (S) means responsive to the counting means R for determining the specific car and axle thereon from which each load greater than a selected level was transmitted.

* * * * *